US008276026B2

(12) United States Patent
Jitsukawa et al.

(10) Patent No.: US 8,276,026 B2
(45) Date of Patent: Sep. 25, 2012

(54) TRANSMISSION APPARATUS, RECEPTION APPARATUS, AND TRANSMISSION/RECEPTION METHOD FOR SAME

(75) Inventors: Daisuke Jitsukawa, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1487 days.

(21) Appl. No.: 11/808,326

(22) Filed: Jun. 8, 2007

(65) Prior Publication Data

US 2008/0010434 A1    Jan. 10, 2008

(51) Int. Cl.
H04L 1/16    (2006.01)
(52) U.S. Cl. ......................................... 714/708; 714/748
(58) Field of Classification Search .................. 714/708, 714/748
See application file for complete search history.

(56) References Cited

U.S. PATENT DOCUMENTS

| 6,430,620 | B1 * | 8/2002 | Omura et al. ................. 709/231 |
| 6,920,602 | B1 | 7/2005 | Park et al. |
| 7,096,402 | B2 | 8/2006 | Yano et al. |
| 7,155,170 | B2 | 12/2006 | Miyoshi et al. |
| 7,339,949 | B2 | 3/2008 | Suzuki et al. |
| 2002/0046379 | A1 | 4/2002 | Miki et al. |
| 2002/0049948 | A1 | 4/2002 | Lee et al. |
| 2003/0053435 | A1 | 3/2003 | Sindhushayana et al. |
| 2004/0042492 | A1 | 3/2004 | Suzuki et al. |
| 2004/0123229 | A1 | 6/2004 | Kim et al. |
| 2005/0239435 | A1 | 10/2005 | Ikeda et al. |
| 2006/0013130 | A1 * | 1/2006 | Bloebaum ..................... 370/229 |

FOREIGN PATENT DOCUMENTS

| CN | 1334991 | 2/2002 |
| CN | 1389031 | 1/2003 |
| CN | 1402463 | 3/2003 |
| EP | 1580918 | 9/2005 |
| JP | 7307769 | 11/1995 |
| JP | 2002152056 | 5/2002 |
| JP | 2004-297200 | 10/2004 |
| JP | 2004-304620 | 10/2004 |
| JP | 2004297200 | 10/2004 |
| WO | 0201743 | 1/2002 |
| WO | 2004/089027 | 10/2004 |

OTHER PUBLICATIONS

Notification of Reasons for Refusal issued by Japanese Patent Office for corresponding Japanese Patent Application No. 2006-546606, dispatch date Jun. 16, 2009 with English translation.
Koji Hashimoto et al.; "Packet and Frame Rate Control Methods for Compressed Video Transmission"; vol. 39, No. 2; pp. 337-346; Dated Feb. 1998. Partial English translation attached.

(Continued)

*Primary Examiner* — Stephen M Baker
(74) *Attorney, Agent, or Firm* — Myers Wolin, LLC

(57) ABSTRACT

A receiving station repeatedly performs decoding processing of data in a decoding processing portion, performs error detection of the decoding results, and transmits to a transmitting station an error detection result (ACK/NACK) for decoding results for a preset number of executions, and moreover issues a request to the transmitting station to modify the data transmission interval based on the data reception characteristic. The transmitting station transmits data at transmission intervals according to the transmission interval modification requests sent from the receiving station. The receiving station selectively inputs to the decoding processing portion the data received from the transmitting station and the previous decoding result data.

18 Claims, 22 Drawing Sheets

OTHER PUBLICATIONS

Japanese Patent Office "Notification of Reasons for Refusal" for corresponding Japanese Patent Application No. 2006-546606, dispatched Jan. 5, 2010. English translation attached.

European Patent Office supplementary European search report for corresponding EP application 04822558.5, dated Jan. 27, 2011.

The State Intellectual Property Office of China "2nd Office Action" for corresponding Chinese Patent Application No. 200480044419.1, issued Jun. 30, 2010. English translation attached.

* cited by examiner

TRANSMISSION APPARATUS, RECEPTION APPARATUS, AND TRANSMISSION/RECEPTION METHOD FOR SAME

BACKGROUND OF THE INVENTION

The present invention relates to a transmission apparatus, a reception apparatus, and a transmission and reception method for same, and in particular relates to a transmission apparatus comprising a retransmission function to transmit new data or retransmit transmitted data based on normal/abnormal reception result data sent from a reception apparatus, a reception apparatus comprising a data transmission interval modification request function, and a transmission and reception method for these.

In packet transmission, error detection codes are used in order to enhance the reliability of communication, and an automated retransmission request (ARQ, Automatic Repeat Request) method is adopted in which the transmitting side is made to retransmit data when an error is detected on the receiving side (see for example JP 2002-9741A).

FIG. 20 is an explanatory diagram of the processing procedure for a Stop-and-Wait ARQ method, which is a basic ARQ method. For simplicity, processing at the transmitting station and receiving station are classified into three processing types, which are transmission processing, reception processing, and decoding processing. The functions of these are as follows.

Transmission processing: Data modulation, error correction encoding, and similar Reception processing: synchronous acquisition of data and similar Decoding processing: Data decoding, error correction decoding, error detection, and similar First, the transmitting station transmits to the receiving station one frame of data (called data 1), which is a transmission data unit, and the receiving station performs reception processing and decoding processing. Next, based on the error detection result, the receiving station transmits to the transmitting station through the control channel an ACK or a NACK signal, which is the reception result for data 1, and the transmitting station performs reception processing and decoding processing for the control channel. At the transmitting station, when a NACK signal is received, data 1 is retransmitted to the receiving station, and when an ACK signal is received, data 2, which is new data, is transmitted.

Here, the time required from the first transmission of data 1 to the retransmission of data 1, or to the first transmission of data 2, is called the Round Trip Time (RTT), that is, the retransmission interval. In the Stop-and-Wait ARQ method, new data or retransmitted data is transmitted in RTT intervals, so that transmission efficiency is low.

FIG. 21 explains the processing procedure for N channel Stop-and-Wait ARQ, which is an improved version of Stop-and-Wait ARQ. By preparing several frames in the retransmission buffer of the transmitting station, the next frame of data can be transmitted without waiting for a report of the data reception result (ACK or NACK signal) for a certain frame, so that transmission efficiency is comparatively high. At the receiving station, in order to process data which is transmitted continuously in this way, pipeline processing is used for the three types of processing which are reception, decoding, and transmission, and each processing operation must end within one frame.

The technology disclosed in JP 2002-9741A is an ARQ method having as an objective improvement of transmission characteristics using ACK/NACK signals. In this ARQ method, the receiving side determines reliability information in demodulated packets, performs error detection, and uses the error detection results and packet reliability information to create ACK/NACK signals, indicated in three or more levels, which are returned to the transmitting side. The transmitting side performs judgment of ACK or NACK signals, and based on the judgment results transmits a new packet or performs retransmission control.

Technology to realize ultra-high speed data transmission and to raise frequency utilization efficiency to the limit, such as for example Orthogonal Frequency Division Multiplexing (OFDM), Multiple-Input Multiple-Output (MIMO) multiplexed transmission, turbo-encoding, Low-Density Parity Check (LDPC) encoding, and similar are being applied to next-generation and future-generation mobile communication systems. Hence because MIMO signal separation, multistage decoding, repeat decoding, and other advanced and complex signal processing is performed at the receiving station, the amount of computation required for decoding processing is enormous.

In order to apply the above-described retransmission control algorithm to such a mobile communication system, the following two requirements must be met.

The first requirement is that, regardless of the enormous amount of computation for decoding processing, the receiving station must complete processing of data sent continuously from the transmitting station within one frame. To this end, a method of performing decoding processing in parallel is conceivable. Also, for processing which cannot easily be performed using parallel processing, such as for example processing in a plurality of stages and repeated decoding, methods such as increasing the number of pipeline stages and increasing the RTT are conceivable. FIG. 22 explains the processing procedure when decoding processing is performed using two-stage pipeline processing. In FIG. 22, by performing two stages of decoding processing using two pipelines for processing, each processing at the receiving station is completed within one frame. As a result, data sent continuously from the transmitting station can be processed.

The second requirement is that the time from data transmission to the reception of an ACK signal (the transmission delay) be short. This is of course a requirement when transmitting media for which real time properties are emphasized, as in the case of video; but even when transmitting media without such real time properties, because of the fast transmission rate, it is desirable that the transmission delay be short in order to limit the retransmission buffer capacity of the transmitting station to a realistic size.

Here, the relation between the number of stages of decoding processing and the transmission delay is considered. If the number of stages is increased the RTT is lengthened, and so when there is a NACK judgment for transmitted data the transmission delay increases. Hence it seems at first that as the number of stages of decoding processing increases, the transmission delay increases. However, in actuality, as the number of stages of decoding processing increases the characteristic is significantly improved, so that the probability of a NACK judgment declines. For example, in the case of turbo code, the greater the increase in the number of decoding repetitions, the more the error rate declines. Hence the RTT is lengthened, but the number of retransmissions decreases, and so it is thought that the overall transmission delay is shortened.

FIG. 23 shows the configuration of a receiving station of the prior art which satisfies the above first and second requirements, and is an example in which decoding processing is performed in three stages. The reception processing circuit 1 performs synchronous acquisition of data and other reception processing. The decoding processing circuit 2 performs error correction decoding and other decoding processing through decoding processing in three stages, which are stages 1 to 3. This decoding processing circuit 2 achieves the required reception characteristic, and employs parallel processing and pipelines to complete processing within one frame. The error detection circuit 3 performs error detection of output signals from the decoding processing circuit 2, and outputs a NACK signal when an error is detected, but outputs an ACK signal when no errors are detected. The transmission processing circuit 4 maps the ACK signal or NACK signal to the control channel, performs data modulation and similar, and transmits data to the transmitting station. By means of this configuration in FIG. 23, continuously transmitted data can be processed, and the transmission delay can be kept short.

However, there have been increases in the circuit scale of receiving stations, such as for example portable mobile terminals, according to the number of pipelines, degree of parallel processing, and number of decoding stages, resulting in the problems of increased power consumption and higher costs.

SUMMARY OF THE INVENTION

Hence in light of the above problems, an object of the invention is to realize retransmission control which avoids increases in the circuit scale of the receiving station, while increasing the number of decoding stages and shortening the transmission delay.

A receiving station of this invention comprises a decoding processing portion, which repeatedly performs decoding processing of data; an error detection portion, which performs error detection of decoding results; a transmission portion, which transmits, to the transmitting station, the error detection results for the decoding results for a preset number of times; a data transmission interval modification request portion, which issues a request to the transmitting station to modify the data transmission interval, based on the data reception characteristic; and, a data selection portion, which selectively inputs to the decoding processing portion data received from the transmitting station and the previous decoding result data.

A transmitting station comprising a retransmission function of this invention comprises a reception portion, which receives data transmission interval modification requests sent from the receiving station, and a transmission interval control portion, which determines the transmission interval based on transmission interval modification requests, and controls transmission of new transmission data or retransmission of transmitted data at the transmission interval thus determined.

In the receiving station, when new data is not being received from the transmitting station, the data selection portion inputs the previous decoding result data to the decoding processing portion, and when new data is being received, inputs the newly received data to the decoding processing portion. Or, when the number of decoding processing repetitions executed is equal to or less than a preset number, the data selection portion inputs the previous decoding result data to the decoding processing portion, and when decoding processing for the preset number of times has been completed, inputs the received data to the decoding processing portion.

The data transmission interval modification request portion issues a request to the transmitting station to lengthen the data transmission interval when the error rate is higher than a stipulated first threshold, issues a request to the transmitting station to shorten the data transmission interval when the error rate is lower than a second threshold, and issues a request to the transmitting station to maintain the data transmission interval when the error rate is equal to or greater than the second threshold and equal to or less than the first threshold. In this case, when lengthening the data transmission interval, the data transmission interval request portion increases the proportion of lengthening of the data transmission interval as the number of retransmissions approaches a maximum number of retransmissions.

The error detection portion performs error detection of decoding results; the transmission portion immediately transmits the error detection result to the transmitting station when there are no errors before the number of decoding reaches a prescribed number; and the data selection portion inputs received data from the transmitting station to the decoding processing portion.

In the transmitting station, when the data transmission interval is lengthened based on a transmission interval modification request, the transmission interval control portion increases the proportion of lengthening of the data transmission interval as the number of retransmissions approaches a maximum number of retransmissions.

The transmitting station further comprises a scheduler which determines the transmission timing for a plurality of receiving stations; the transmission interval control portion essentially transmits data according to the transmission timing indicated by the scheduler, and when the transmission timing indicated by the scheduler is faster than the transmission timing based on transmission interval modification requests from receiving stations, performs data transmission according to the transmission timing based on the transmission interval modification requests from the receiving stations.

DESCRIPTION OF THE PREFERRED EMBODIMENTS

(A) First Embodiment (a) Receiving Station

Figure 1:
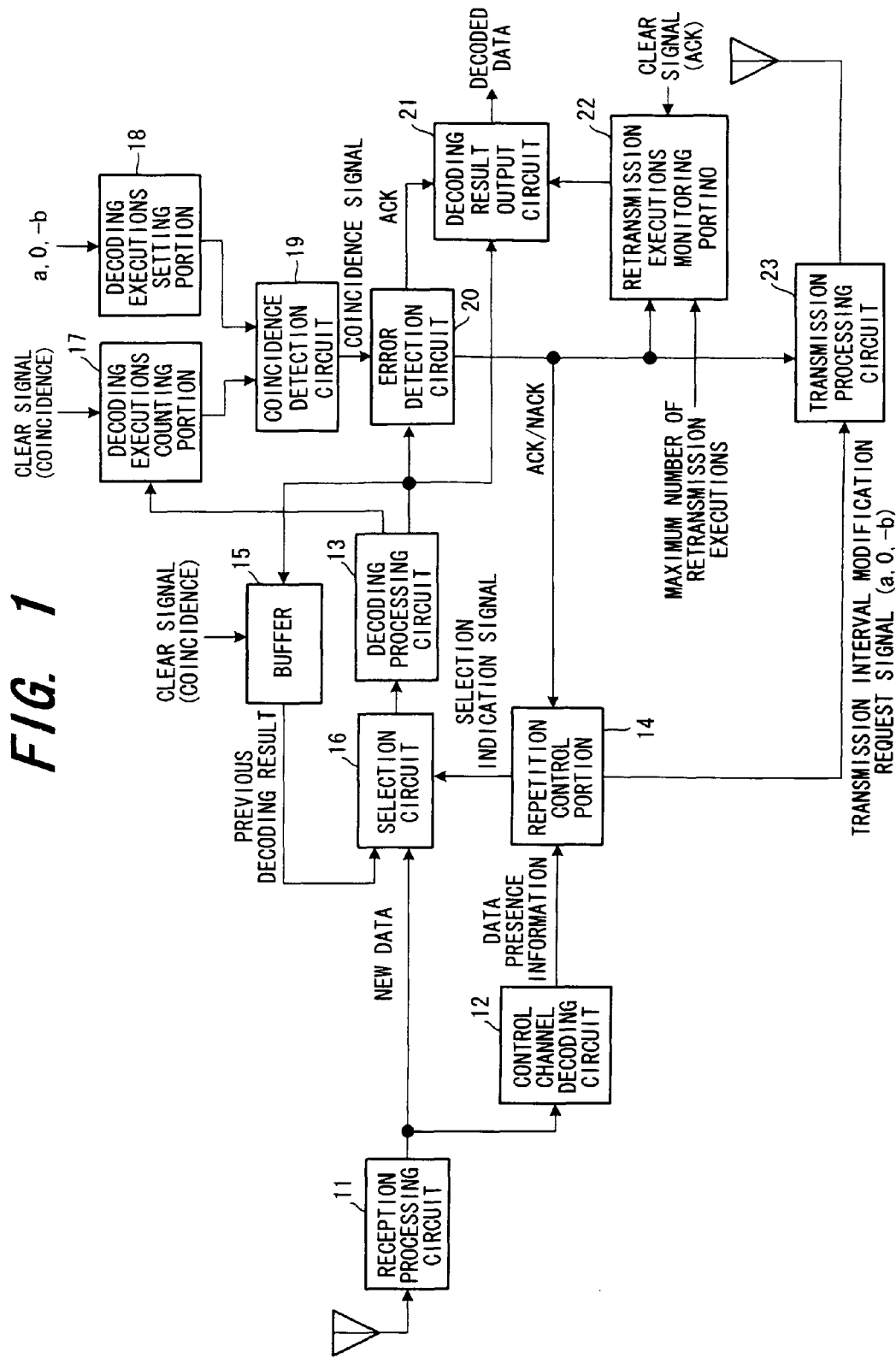
FIG. 1 shows the configuration of the receiving station of a first embodiment.

FIG. 1 shows the configuration of the receiving station of a first embodiment; control data is sent over a control channel, and data is multiplexed and sent over a data channel from the transmitting station. The reception processing circuit 11 performs synchronous acquisition of data and other reception processing of reception signals sent from the transmitting station, and stores received data in an internal buffer. The control channel decoding circuit 12 decodes the control channel, to judge whether the data channel comprises data. The HSDPA (High Speed Downlink Packet Access) method in W-CDMA or another well-known format may be adopted for the data channel.

Under the control of the repetition control portion 14, the decoding processing circuit 13 performs error correction decoding processing, such as for example turbo code decoding processing, a preset number of times, each time saving the decoding results in the buffer 15. The selection circuit 16 selects newly received data stored by the reception processing circuit 11 or the previous decoding results stored in the buffer 15, according to an instruction from the repetition control portion 14, and inputs the data to the decoding processing circuit 13. The error detection circuit 20 performs error detection of decoding results output from the decoding processing circuit 13 after repetition decoding processing the preset number of times.

The decoding executions counting portion 17 counts the number of times decoding has been performed by the decoding processing circuit 13, and the decoding executions setting portion 18 sets the number of times decoding is to be executed, as well as modifying the set number of executions based on transmission interval modification requests, described below. The coincidence detection circuit 19 checks for coincidence of the set number of executions with the number of repetitions of decoding processing by the decoding processing circuit 13, and upon coincidence, outputs a coincidence signal. As a result of this coincidence signal, the contents of the buffer 15 and the decoding executions counting portion 17 are cleared. In addition, the coincidence signal causes the error detection circuit 20 to perform error detection processing for the decoding result subjected to the set number of repetitions, and if there is no error outputs an ACK signal, but in the even of an error outputs a NACK signal. The decoding result output circuit 21 transmits the decoding result output from the decoding processing circuit 13 as a result of the ACK signal, and when the number of retransmissions is equal to the maximum number of retransmissions, outputs the decoding result, regardless of an ACK or NACK signal. The retransmission executions monitoring portion 22 counts the number of NACK signals and monitors the number of retransmissions, and is cleared by an ACK signal. The transmission circuit 23 transmits the ACK/NACK signals output from the error detection portion 20 to the transmitting station over the control channel, and transmits transmission interval modification request signals, described below, which are output from the repetition control portion 14, to the transmitting station over the control channel.

The repetition control portion 14 comprises two functions. The first is a function for controlling switching of the selection circuit 16, based on the presence or absence of data in the data channel. That is, the repetition control portion 14 indicates to the selection circuit 16 whether to continue repetitive decoding, or to decode newly received data.

Figure 2:
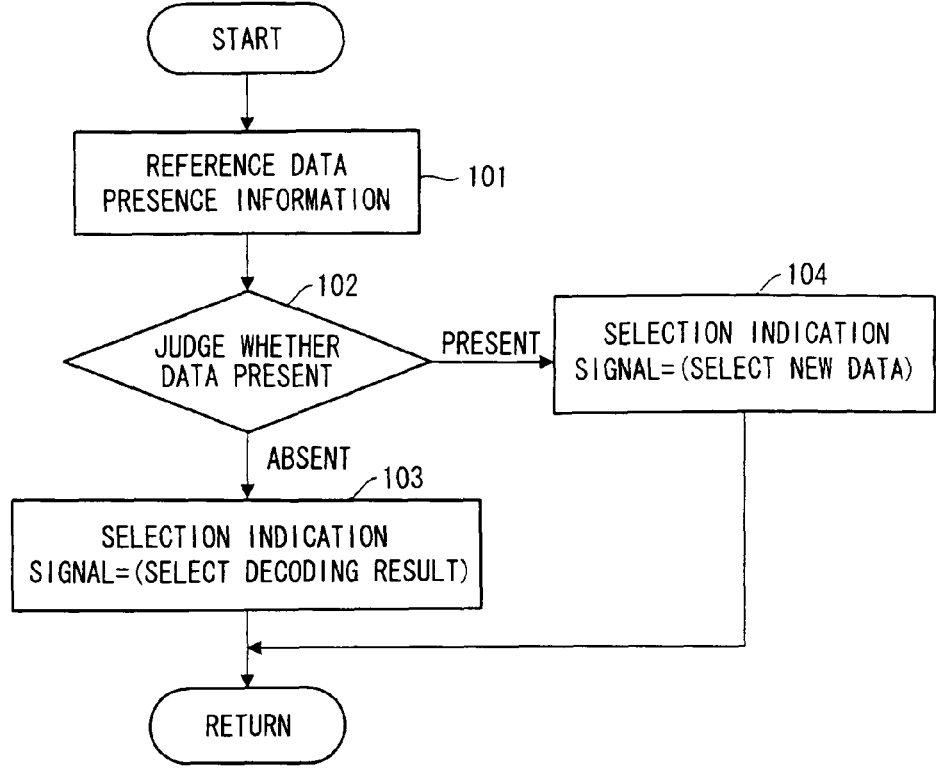
FIG. 2 shows the flow of first data selection control processing.

FIG. 2 shows the flow of first data selection control processing; the repetition control portion 14 references the control channel decoding results (step 101), judges whether data is present in the data channel based on the control channel decoding results (step 102), and if no newly received data exists, instructs the selection circuit 16 to decode the previous decoding result stored in the buffer 15 (step 103). As a result, the selection circuit 16 inputs the previous decoding result, stored in the buffer 15, to the decoding processing circuit 13. If on the other hand newly received data exists, the repetition control portion 14 instructs the selection circuit 16 to decode the newly received data (step 104). As a result, the selection circuit 16 inputs the newly received data, stored in the reception circuit 11, to the decoding processing circuit 13.

Figure 3:
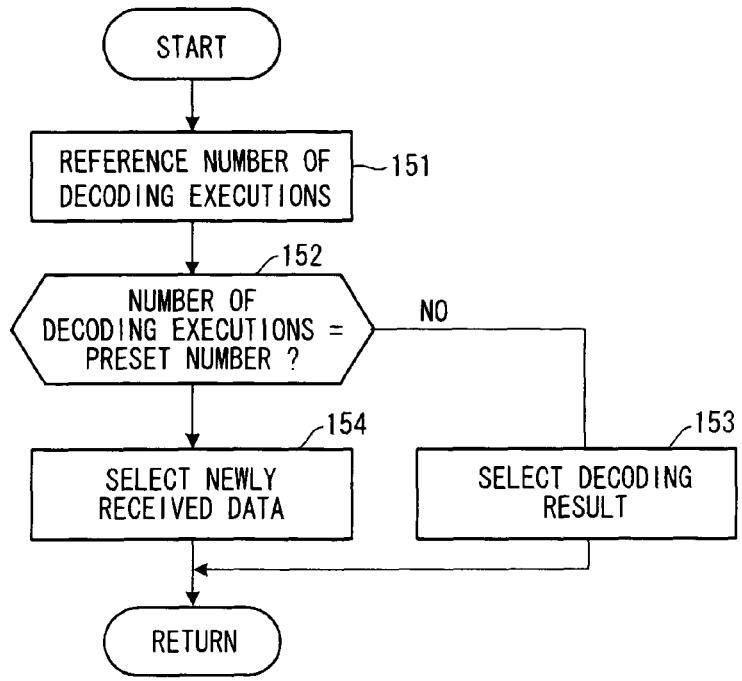
FIG. 3 shows the flow of second data selection control processing.

FIG. 3 shows the flow of second data selection control processing by the repetition control portion 14. The repetition control portion 14 references the count value (number of decoding executions) of the decoding executions counting portion 17 (step 151), judges whether the number of decoding executions has reached the preset number of executions (step 152), and if the number is smaller than the preset number of executions, instructs the selection circuit 16 to repeat decoding of the previously decoding result, stored in the buffer 15 (step 153). As a result, the selection circuit 16 inputs to the decoding processing circuit 13 the previous decoding result, stored in the buffer 15. If on the other hand the number of decoding executions is equal to the preset number of executions, the repetition control portion 14 instructs the selection circuit 16 to decode newly received data (step 154). As a result, the selection circuit 16 inputs newly received data, stored in the reception circuit 11, to the decoding processing circuit 13.

The repetition control portion 14 can perform data selection control using both methods shown in FIG. 2 and FIG. 3.

The second function of the repetition control portion 14 is generation of transmission interval modification request signals, using the ACK/NACK signals which are error detection results. When the data reception characteristic deteriorates and the error rate exceeds the first threshold, the data reception characteristic can be improved by increasing the number of stages of decoding processing. However, because the decoding processing of the receiving station in FIG. 1 is configured such that a single decoding processing circuit 13 is used repeatedly, simply increasing the number of stages would mean that data for transmission could not be processed continuously. Hence the repetition control portion 14 issues a request to the transmitting station for modification of the transmission interval so as to lengthen the data transmission interval, according to the processing flow in FIG. 4. When the data transmission interval becomes longer, the decoding processing circuit 13 can execute decoding processing a greater number of times than had been previously possible, so that the error rate can be lowered.

Figure 4:
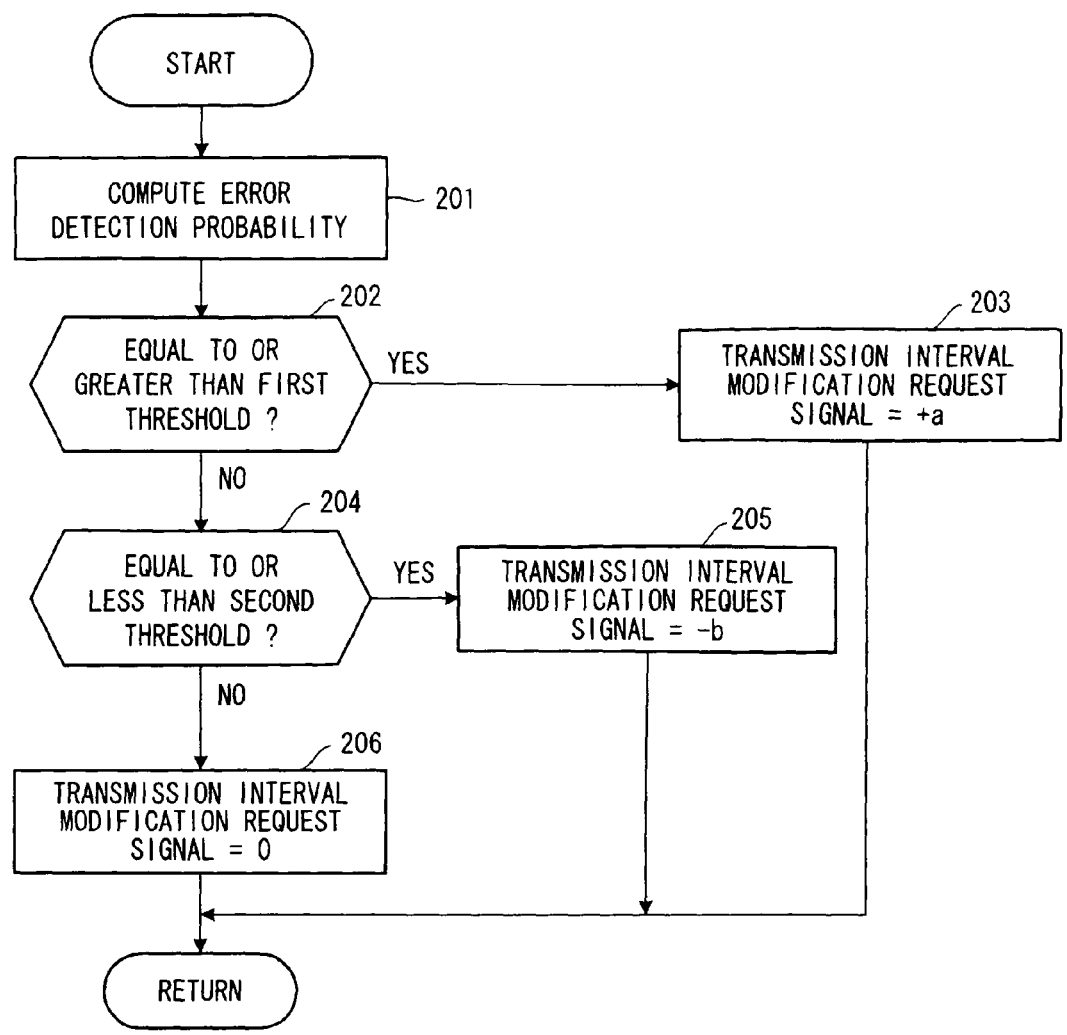
FIG. 4 shows the flow of processing to create data transmission interval modification request signals.

FIG. 4 shows the flow of processing to create transmission interval modification request signals. The repetition control portion 14 uses the error detection result ACK/NACK signals to calculate the error detection probability (probability of error occurrence) in a prescribed interval (step 201), and compares the error occurrence probability with a stipulated first threshold (step 202). When the error occurrence probability is higher than the stipulated first threshold, the data reception characteristic is judged to have deteriorated, and the transmission interval modification request signal is created to request lengthening of the data transmission interval by a frames (step 203). When on the other hand the error occurrence probability is lower than the stipulated first threshold, the error occurrence rate and a stipulated second threshold are compared (step 204), and if the error occurrence rate is lower than the second threshold, the data reception characteristic is judged to be excessively good, and a transmission interval modification request signal is created to request shortening of the data transmission interval by b frames (step 205). When the error occurrence rate is equal to or greater than the second threshold, and equal to or less than the first threshold, a transmission interval modification request signal is created requesting maintenance of the data transmission interval (step 206). The transmission processing circuit 23 maps the transmission interval modification request signal, ACK/NACK signal, and a receiving station identification signal to the control channel, performs data modulation and similar, and transmits the data to the transmitting station.

When the transmission interval modification request signal is transmitted to the transmitting station, the decoding executions setting portion 18 (1) increases the number of executions setting by a when there is a request to lengthen the data transmission interval by a frames, and (2) decreases the number of executions setting by b when there is a request to shorten the data transmission interval by b frames, to update the number of executions setting.

(b) Transmitting Station

Figure 5:
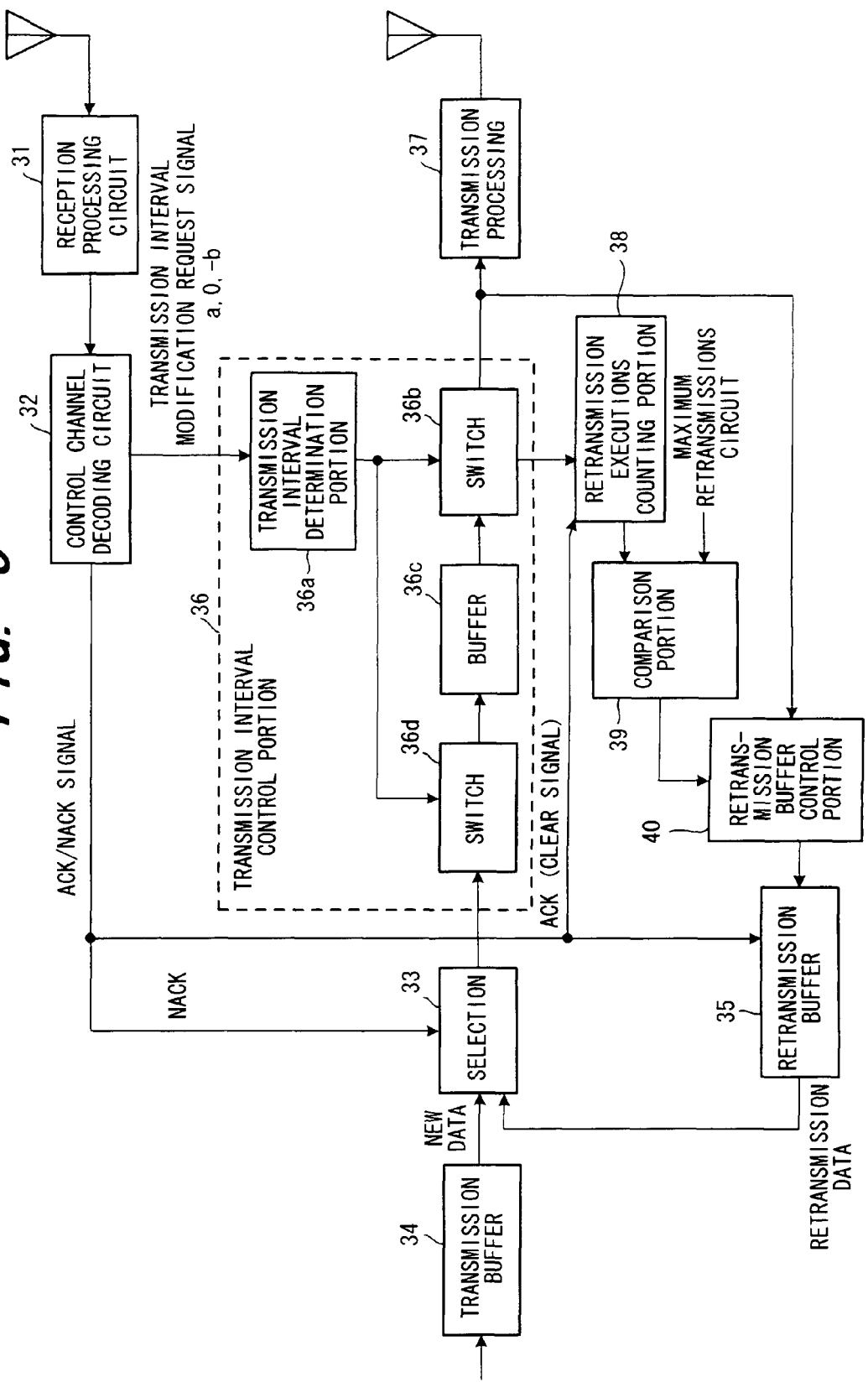
FIG. 5 shows the configuration of the transmitting station of the first embodiment.

FIG. 5 shows the configuration of the transmitting station of the first embodiment. The reception processing circuit 31 performs synchronous acquisition of data and other processing of the received signal. The control channel decoding circuit 32 restores ACK or NACK signals, transmission interval modification request signals, and receiving station identification signals sent from the receiving station by decoding the control channel. The selection circuit 33 outputs new data (new packets) accumulated in the transmission buffer 34 when an ACK signal is input from the control channel decoding circuit, and outputs retransmission data (retransmission packets) accumulated in the retransmission buffer 35 when a NACK signal is input. The transmission interval control portion 36 transmits data (packets) in a transmission interval based on transmission interval modification request signals input from the control channel decoding circuit 32. That is, the transmission interval determination portion 36a increases the transmission interval TS by TS=TS+a when the transmission interval modification request is +a, does not modify the transmission interval TS when the transmission interval modification request is 0, and shortens the transmission interval TS by TS=TS−b when the transmission interval modification request is −b. The switch 36b transmits data accumulated in the buffer 36c only when the time TS of the transmission interval has elapsed since the previous data transmission; the switch 36d retrieves the next data from the selection circuit 33 and stores the data in the buffer 36c.

From the above, the transmission interval control portion 36 increases the transmission interval by a frames over the current value when the transmission interval modification request is +a, and maintains the transmission interval at the current value when the transmission interval modification request is 0. When the transmission interval modification request is −b, the transmission interval is shortened by b frames from the current value.

The transmission processing circuit 37 performs data modulation and other processing of data (packets), and transmits data to the receiving station. The retransmission executions counting portion 38 counts the number of retransmissions executed, the comparison portion 39 compares the number of retransmissions executed with the preset maximum number of retransmissions, and the retransmission buffer control portion 40 writes retransmission data to the retransmission buffer 35 if the number of retransmission executions is smaller than the maximum number of retransmission executions, but clears the retransmission buffer 35, without writing retransmission data, if the number of retransmission executions is equal to the maximum number of retransmissions. That is, the retransmission buffer 35 accumulates data transmitted in the past, but when the number of retransmissions executed reaches a stipulated maximum number of retransmissions, the corresponding accumulated data is discarded. The retransmission buffer 35 discards accumulated data upon receiving an ACK signal, and the retransmission executions counting portion 38 clears the count value as a result of an ACK signal. The transmission buffer 34 accumulates new data, and discards data which has been transmitted once.

Figure 6:
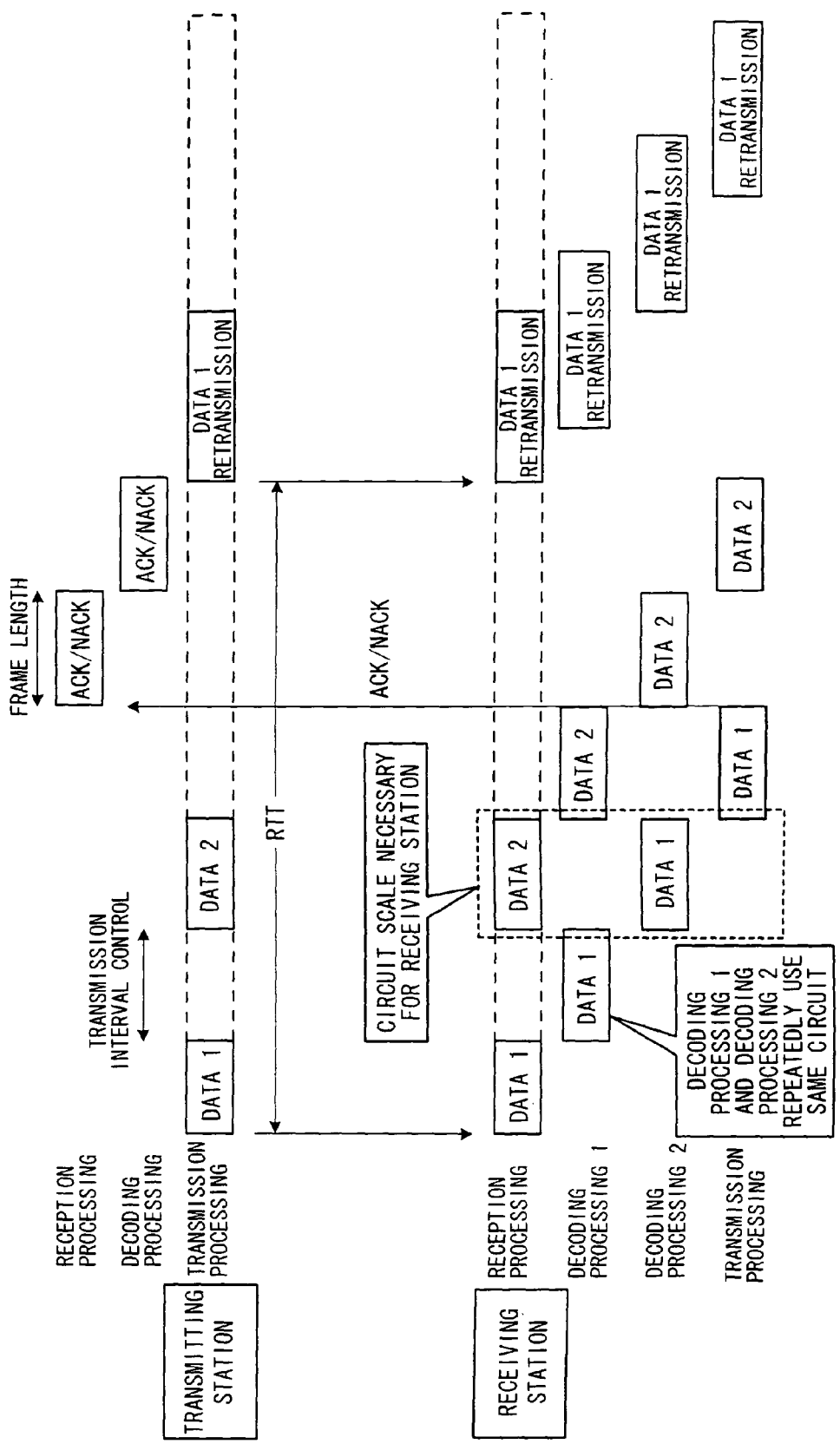
FIG. 6 shows the processing procedure for the packet transmission method of the first embodiment.
Figure 21:
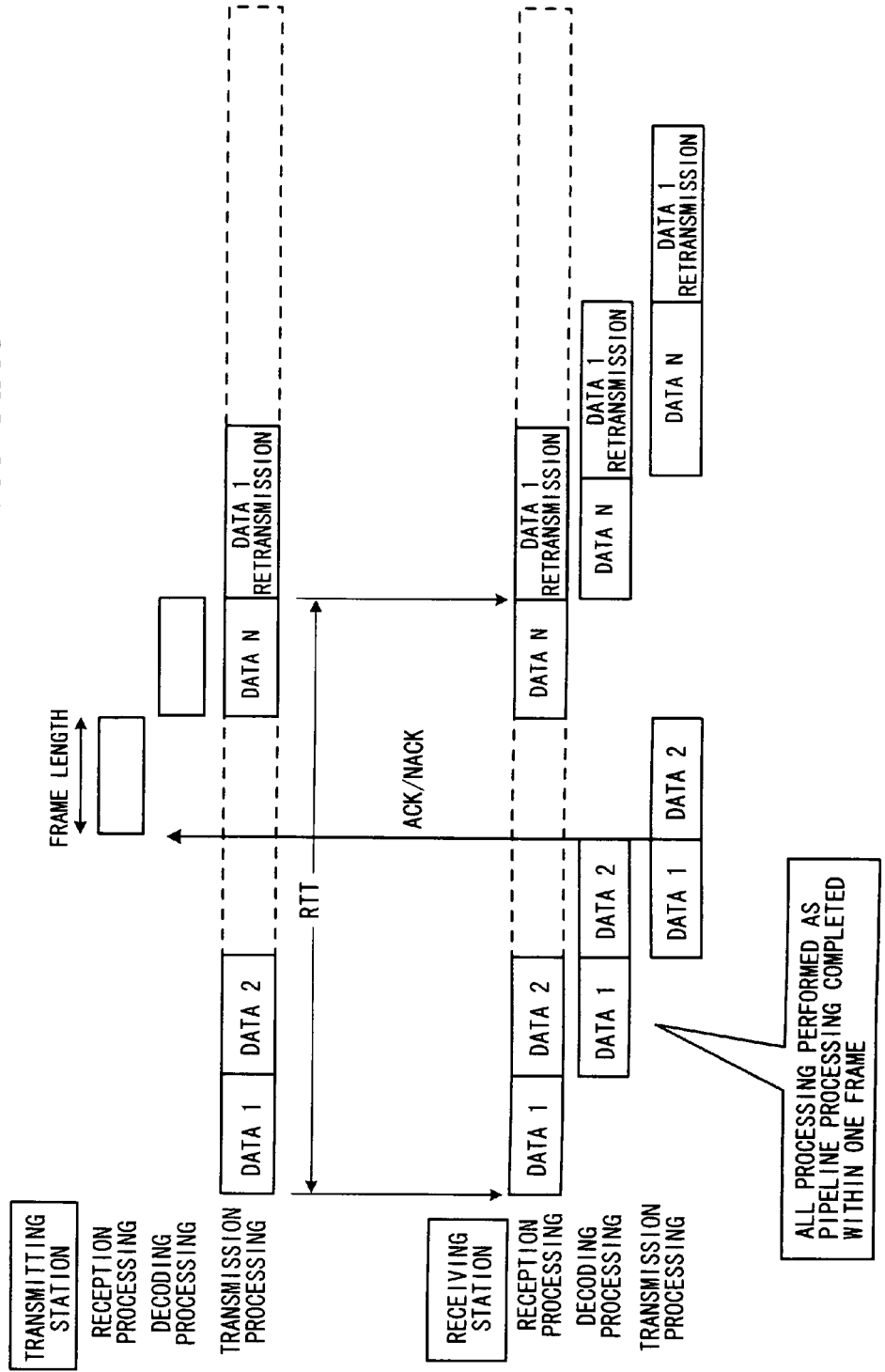
FIG. 21 explains the procedure of processing of the N-channel Stop-and-Wait ARQ method, which is an improved version of the Stop-and-Wait ARQ method.
Figure 22:
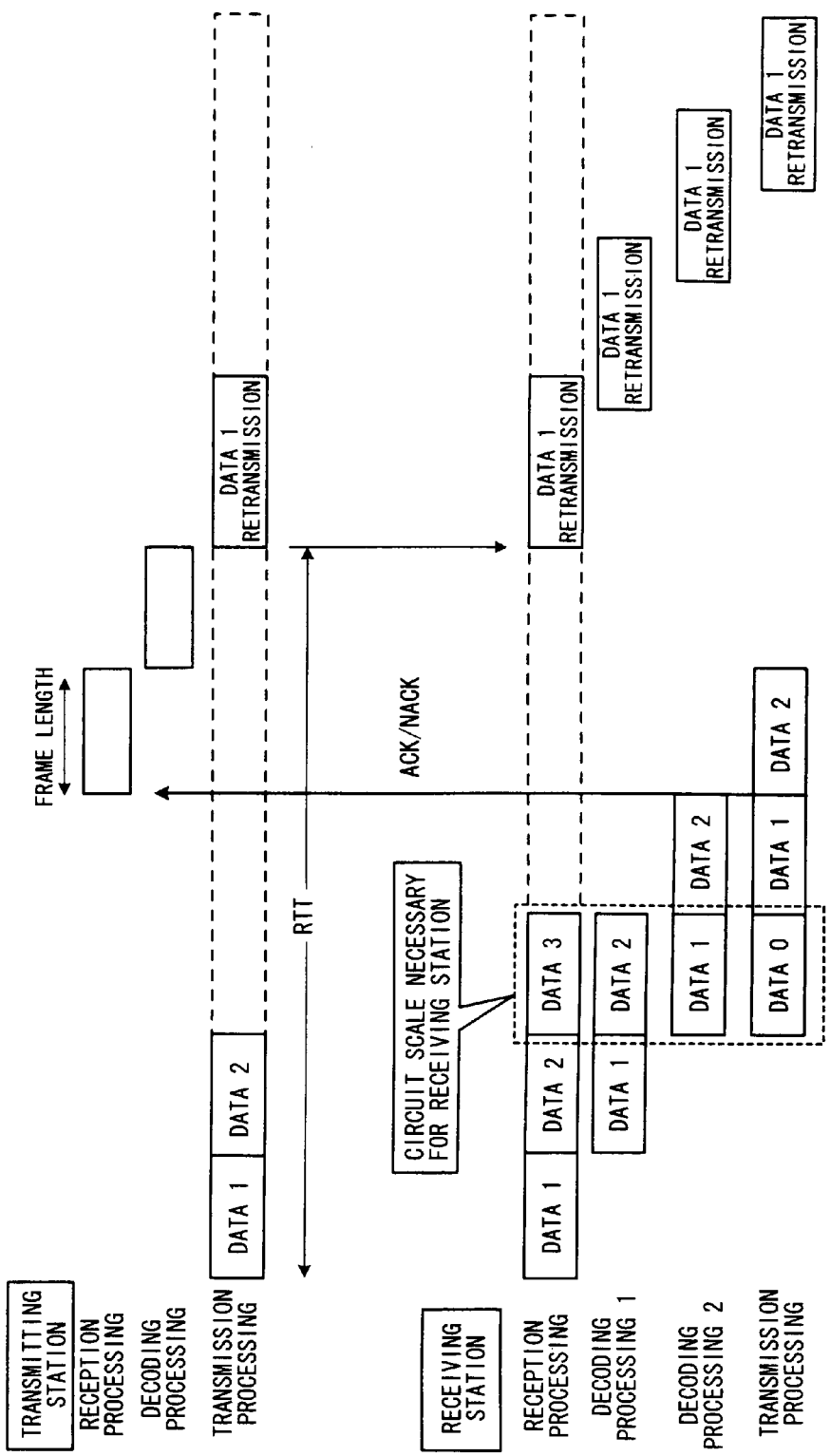
FIG. 22 explains the procedure of processing when performing decoding processing through two-stage pipeline processing; and, FIG. 23 shows the configuration of a receiving station of the prior art.
Figure 23:
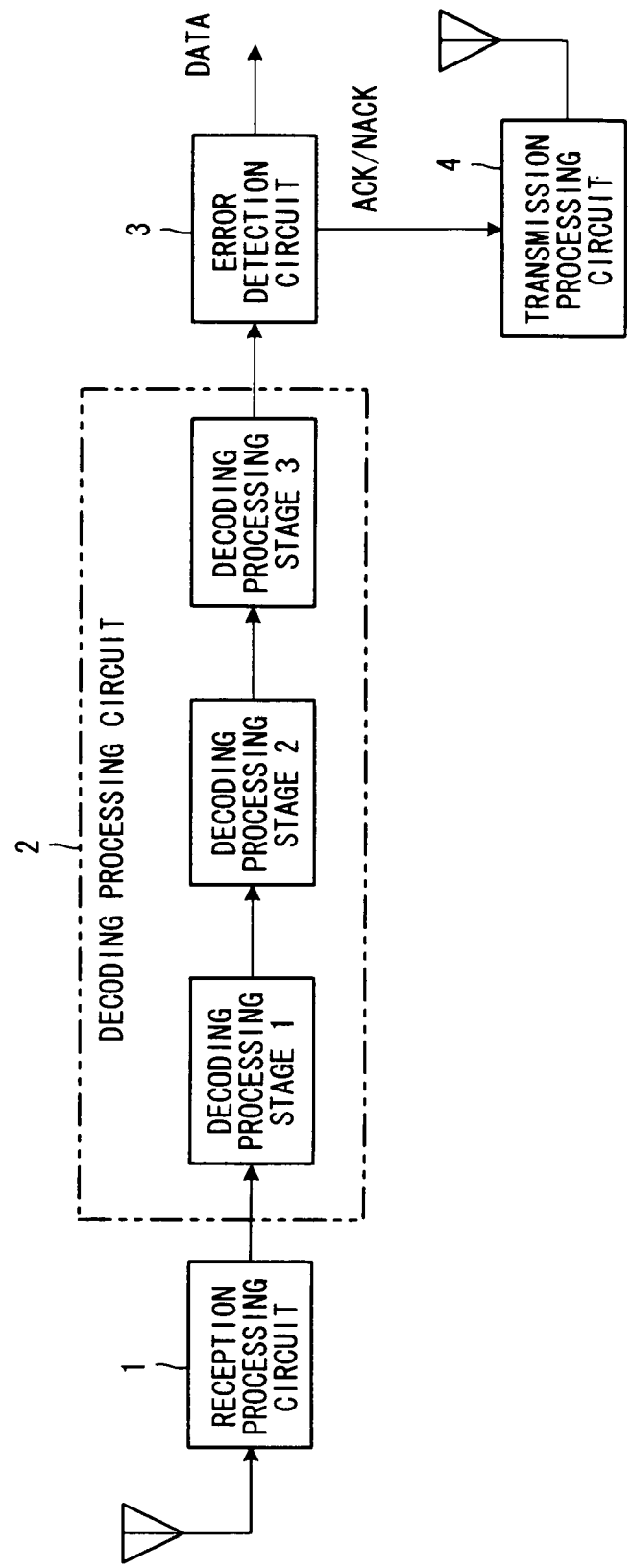

FIG. 6 shows the processing procedure of the packet transmission method of the first embodiment. At the receiving station, data transmitted from the transmitting station is subjected to reception processing and decoding processing. First, transmission and reception are performed with the number of decoding stages set to one, as in FIG. 21. The receiving station judges that the data reception characteristic has deteriorated, and transmits a transmission interval modification request signal to the transmitting station so as to increase the transmission interval by one frame. The transmitting station increases the transmission interval by one frame in accordance with the request from the receiving station, as shown in FIG. 6, and transmits data. In this case, data 1 is output from the reception processing circuit 11 at the receiving station, and by twice repeating one stage worth of decoding by the decoding processing circuit 13 within the period until the next data 2 is output, two stages' worth of decoding processing can be performed. As a result, compared with a packet transmission method of the prior art (FIG. 21) in which the transmission interval is zero frames and the decoding processing is performed in one stage, the data reception characteristic is improved, and ultimately the transmission delay is shortened. When lengthening by a frames, decoding processing can be repeated a times.

From the above, in the first embodiment, by repeatedly using the decoding processing circuit 13 of the receiving station, the number of stages of decoding processing can be increased. That is, the number of stages can be increased or decreased and the data reception characteristic can be improved without increasing the circuit scale, and ultimately the transmission delay can be shortened. Further, at the transmitting station the data transmission interval can be controlled according to the number of stages in decoding processing, and at the receiving station, all the data transmitted from the transmitting station can be processed. For the receiving station, the transmission efficiency declines as the transmission interval is lengthened; but at the transmitting station, data can be transmitted to another receiving station during the transmission interval for the receiving station, and in this way the transmission efficiency for the entire communication system can be kept from declining. In the first embodiment, the data reception state is detected based on error detection results, and the transmission interval is modified based on the data reception state; hence data transfer can be performed at an appropriate data transmission interval for the data reception state and with minimal errors.

(B) Second Embodiment

Figure 7:
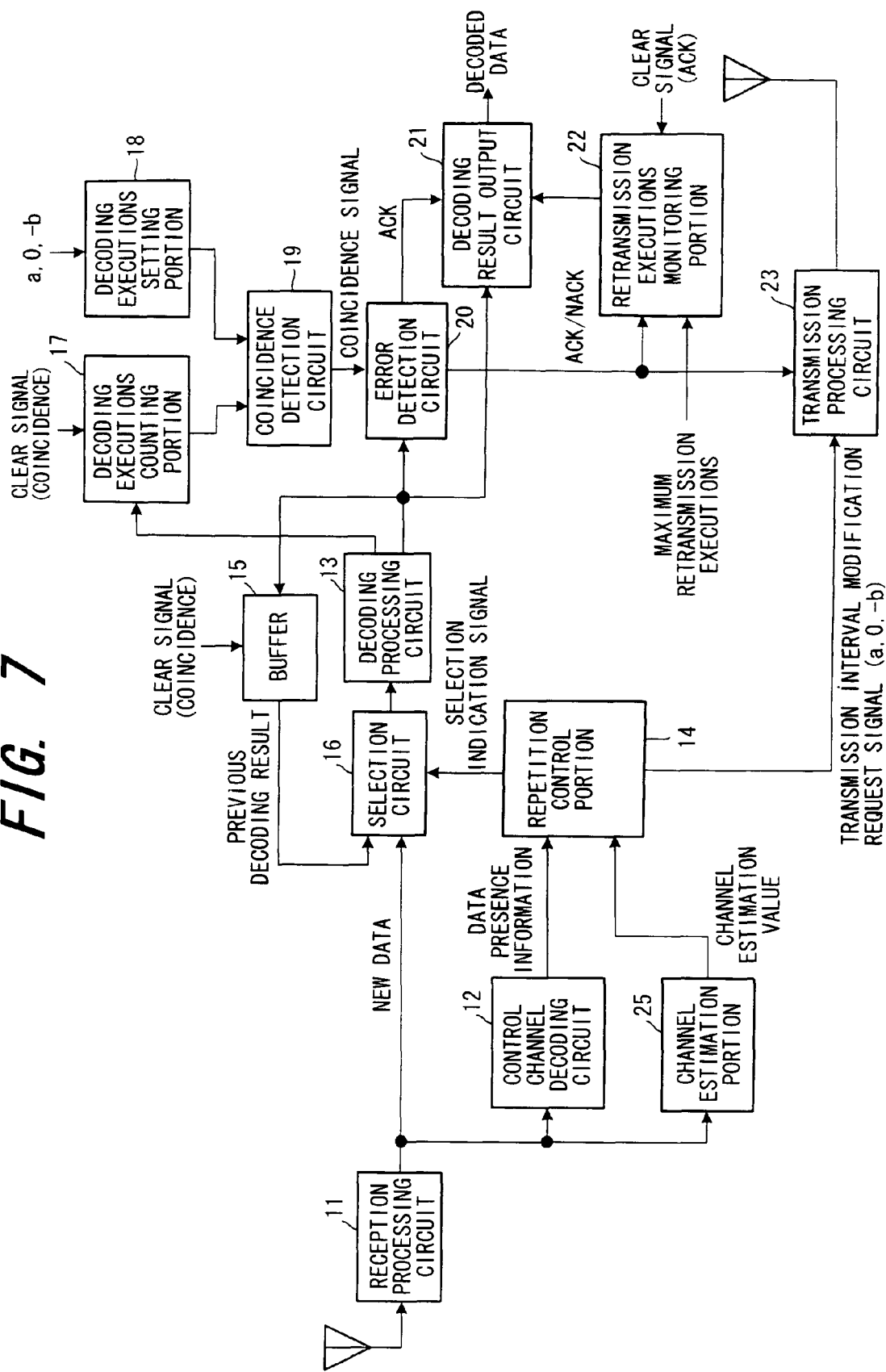
FIG. 7 shows the configuration of the receiving station of a second embodiment.

FIG. 7 shows the configuration of the receiving station of a second embodiment. In the first embodiment, data transmission interval modification request signals were created based on the error occurrence rate; in the second embodiment, data transmission interval modification request signals are created based on the signal power-to-interference power ratio SIR. That is, in the first embodiment the error detection result of repeated decoding results was used to judge the quality of the data reception characteristic; but because the data reception characteristic is closely related to the state of the communication path, in the second embodiment the SIR value (signal-to-noise ratio) is used to judge the quality of the data reception characteristic.

In the second embodiment of FIG. 7, portions which are the same as in the first embodiment in FIG. 1 are assigned the same symbols. Differences are the fact that the channel estimation circuit 25 uses a known pilot signal to estimate the communication path state (channel state) and input the channel estimation value to the repetition control portion 14, and the fact that the repetition control portion 14 calculates the SIR value using the channel estimation value, and creates the data transmission interval modification request signal based on the SIR value.

Figure 8:
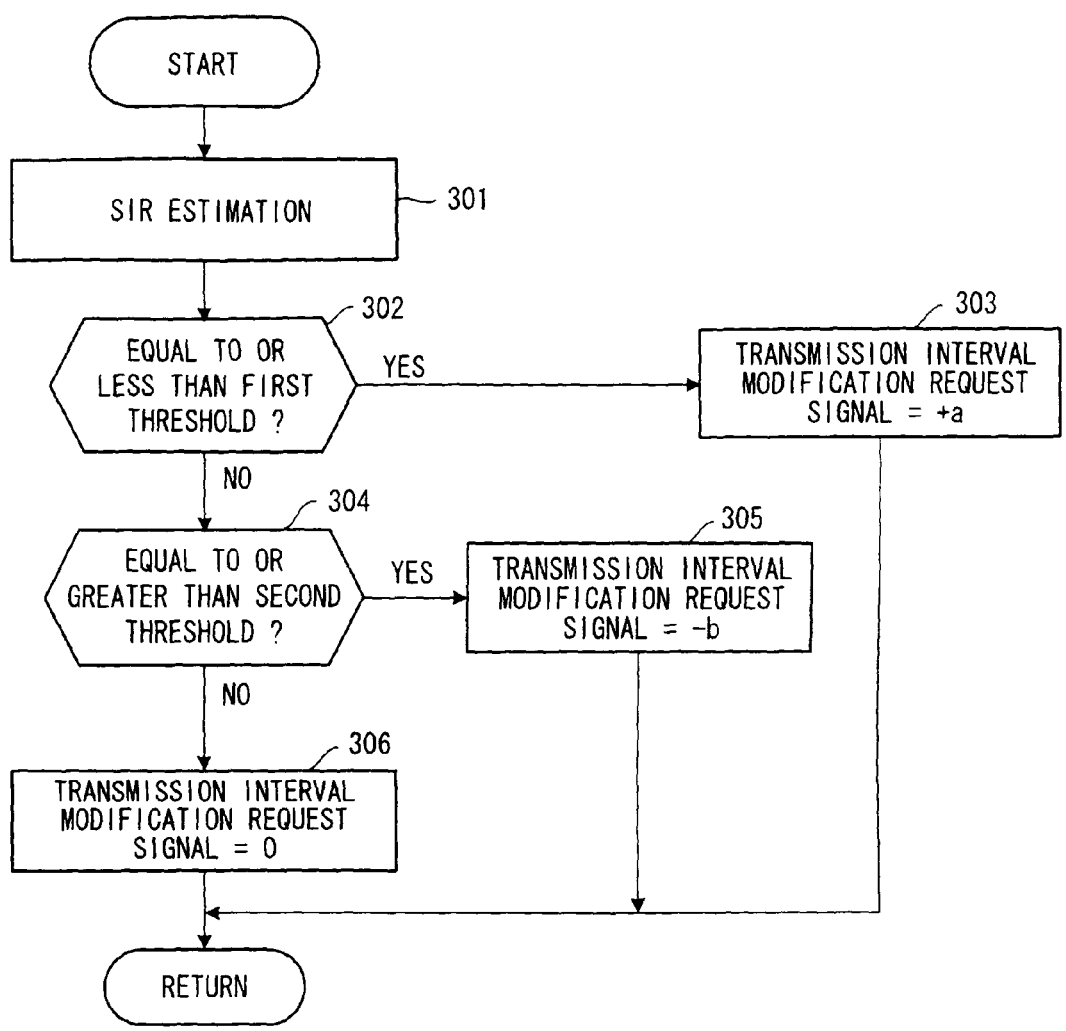
FIG. 8 shows the flow of processing to create transmission interval modification request signals in the repetition control portion of the second embodiment.

FIG. 8 shows the flow of processing to create a transmission interval modification request signal in the repetition control portion 14.

The repetition control portion 14 estimates the SIR value from the channel estimation value (step 301). As an example of a SIR estimation method, the signal power S is determined from the power of the channel estimation value, which is a complex signal, the interference power I is determined from variance of the channel estimation value, and finally S is divided by I to determine the SIR value.

Next, the SIR value is compared with a stipulated first threshold (step 302). If the SIR value is lower than the stipulated first threshold, the data reception characteristic is judged to be deteriorated, and a transmission interval modification request signal is created to request lengthening of the data transmission interval by a frames (step 303). If on the other hand the SIR value is higher than the stipulated first threshold, the SIR value is compared with a stipulated second threshold (step 304), and if the SIR value is higher than the second threshold, the data reception characteristic is judged to be excessively good, and a transmission interval modification request signal is created to request shortening of the data transmission interval by b frames (step 305). If the SIR value is equal to or greater than the first threshold, and equal to or less than the second threshold, then a transmission interval modification request signal is created to maintain the data transmission interval (step 306). The transmission processing circuit 23 maps transmission interval modification request signals, ACK/NACK signals, and a receiving station identification signal to the control channel, performs data modulation and similar, and transmits the data to the transmitting station.

According to the second embodiment, the data reception state is detected based on the SIR value, and the transmission interval is modified based on the data reception state, so that data transfer can be performed at an appropriate data transmission interval according to the data reception state, with minimal errors.

In the above first and second embodiments, the data reception state was detected based on the SIR value or error occurrence rate; but the data reception state can also be detected by another detection method.

(C) Third Embodiment

Figure 9:
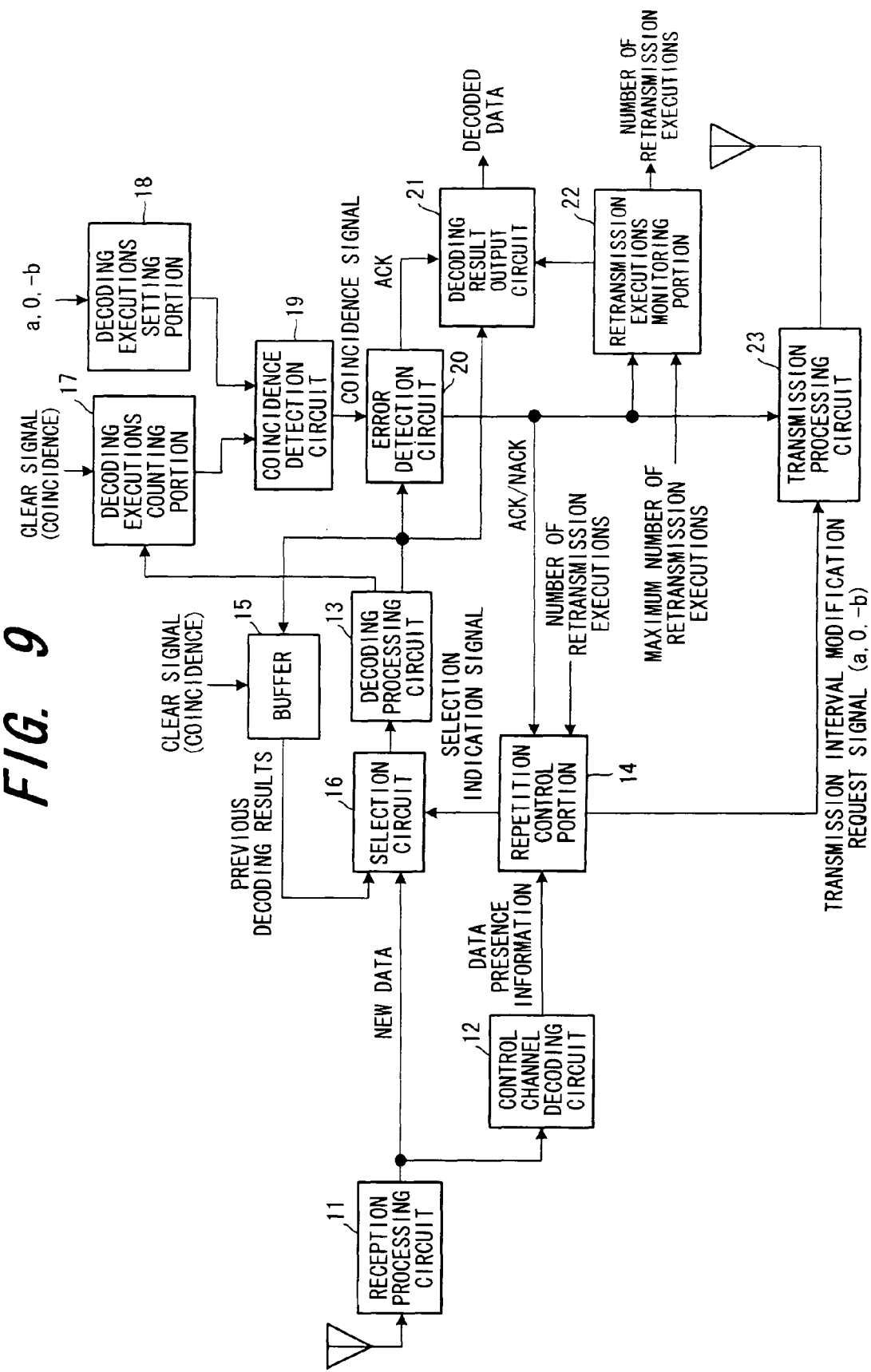
FIG. 9 shows the configuration of the receiving station of a third embodiment.

FIG. 9 shows the configuration of the receiving station in a third embodiment, portions which are the same as in the first embodiment in FIG. 1 are assigned the same symbols. Differences are the fact that the number of retransmission executions is input to the repetition control portion 14, and the fact that in the repetition control portion 14, the transmission interval modification request signal is created taking the number of transmission executions into account.

In the first and second embodiments, the receiving station sent transmission interval modification request signals to the transmitting station based on the data reception characteristic, and the transmitting station determined the data transmission interval based on transmission interval modification request signals. By means of this measure the data reception characteristic is improved, so that the overall number of retransmission executions is decreased. However, in some cases there may be NACK judgments even when there are numerous retransmissions, and when the number of retransmissions exceeds a stipulated maximum number of retransmissions, ultimately data errors remain. In order to avoid this problem, the receiving station creates transmission interval modification request signals based on the number of retransmissions. In other words, the repetition control portion 14 determines the transmission interval as indicated by (1) through (3) below.

(1) If (number of retransmission executions)<(maximum number of retransmission executions)−1, then the transmission interval increase amount is a frames.

(2) If (number of retransmission executions)=(maximum number of retransmission executions)−1, then the transmission interval increase amount is (a+1) frames.

(3) If (number of retransmission executions)=(maximum number of retransmission executions), then the transmission interval increase amount is (a+2) frames.

As a result, the closer the approach to the maximum number of retransmission executions, the greater the improvement in data reception characteristic, and so remaining data errors can be suppressed.

Figure 10:
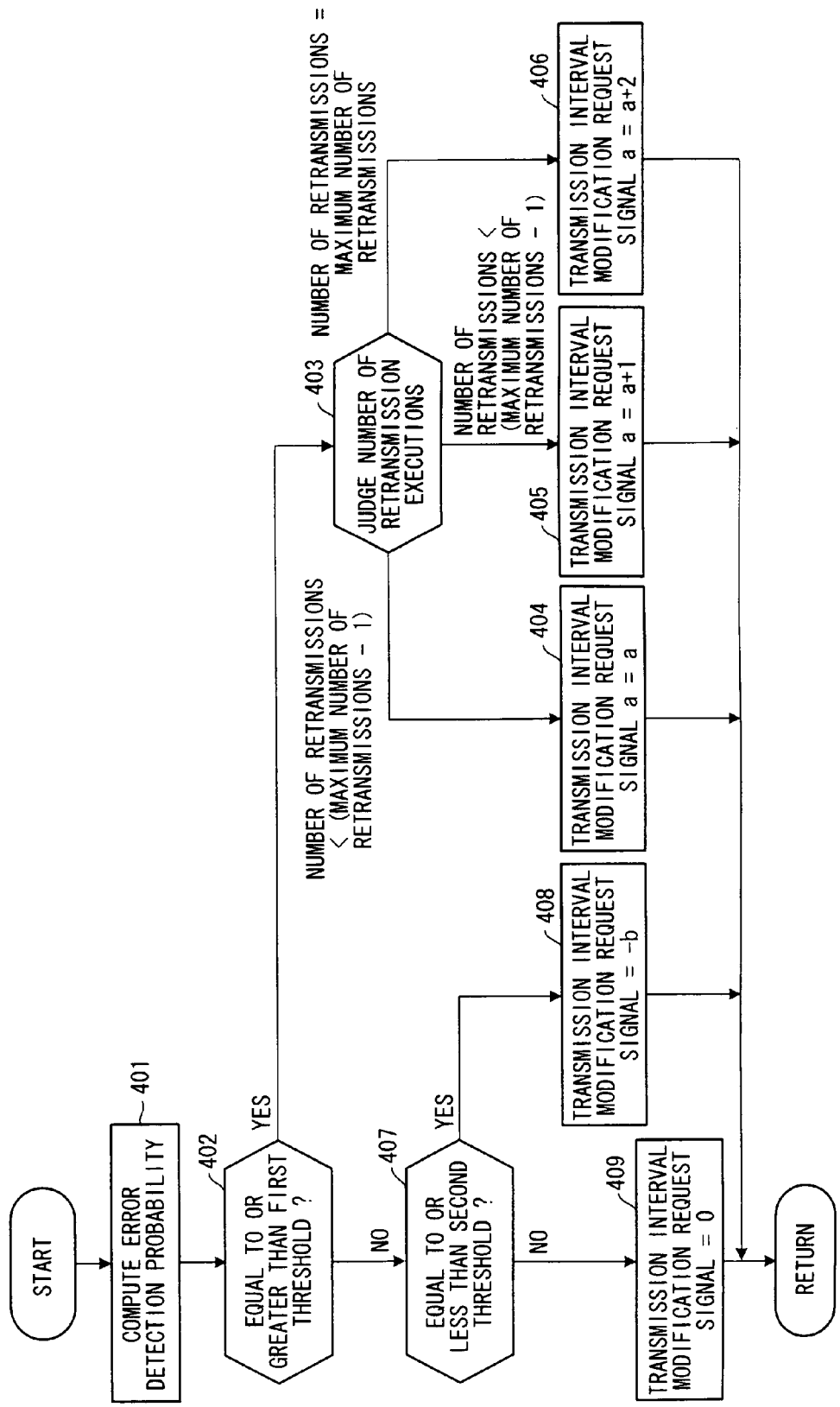
FIG. 10 shows the flow of processing to create transmission interval modification request signals in the repetition control portion of the third embodiment.

FIG. 10 shows the flow of processing to create transmission interval modification request signals in the repetition control portion 14 of the third embodiment. The repetition control portion 14 uses ACK/NACK signals which are error detection results to calculate the error detection probability (error occurrence rate) at a certain time (step 401), and compares the error occurrence rate with a stipulated first threshold (step 402). If the error occurrence rate is higher than the stipulated first threshold, the data reception characteristic is judged to have deteriorated, and the number of retransmission executions is compared with the maximum number of retransmission executions (step 403).

If the comparison result indicates that (number of retransmission executions)<(maximum number of retransmission executions)−1, then a transmission interval modification request signal is created with the transmission interval increase amount set to a frames (step 404). If (number of retransmission executions)=(maximum number of retransmission executions)−1, then the transmission interval modification request signal is created with the transmission interval increase amount set to (a+1) frames (step 405). And, if (number of retransmission executions)=(maximum number of retransmission executions), then the transmission interval modification request signal is created with the transmission interval increase amount set to (a+2) frames (step 406).

If on the other hand the error occurrence rate is lower than the stipulated first threshold in step 402, then the error occurrence rate is compared with a stipulated second threshold (step 407), and if the error occurrence rate is lower than the second threshold, the reception characteristic is judged to be excessively good, and the transmission interval modification request signal is created to request that the data transmission interval be shortened by b frames (step 408). If the error occurrence rate is equal to or greater than the second threshold, and equal to or less than the first threshold, then the transmission interval modification request signal is created requesting that the data transmission interval be maintained (step 409). The transmission processing circuit 23 maps transmission interval modification request signals, ACK/NACK signals, and a receiving station identification signal to the control channel, performs data modulation and similar, and transmits the data to the transmitting station.

Figure 11:
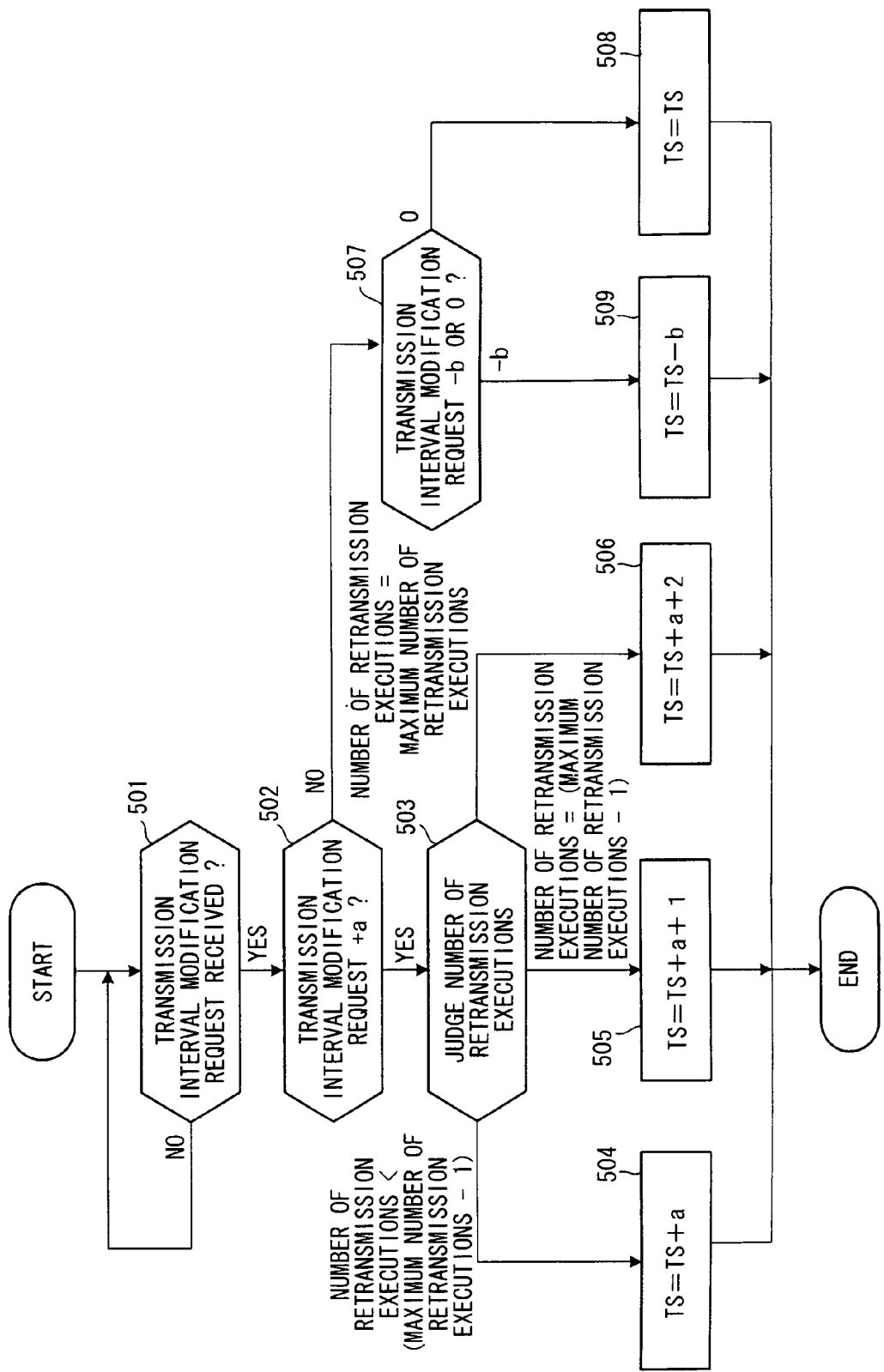
FIG. 11 shows the flow of transmission interval modification processing in the transmitting station of the third embodiment.

The above is an example of creation of transmission interval modification request signals at the receiving station taking into account the number of retransmission executions; but this transmission interval modification control can be performed at the transmitting station as well. That is, the transmission interval determination portion 36a (see FIG. 5) of the transmitting station determines the transmission interval taking into account both transmission interval modification request signals, and the number of retransmissions of data to be transmitted. FIG. 11 shows the flow of processing for transmission interval modification in the third embodiment.

The transmission interval determination portion 36a monitors the reception of transmission interval modification request signals (step 501), and upon reception, checks whether the transmission interval modification request is +a (step 502), and if +a, compares the number of retransmission executions with a preset maximum number of retransmission executions (step 503).

If as a result of comparison (number of retransmission executions)<(maximum number of retransmission executions) −1, then the transmission interval TS is increased as TS=TS+a, taking the transmission interval increase amount to be a frames (step 504). If (number of retransmission executions)=(maximum number of retransmission executions) −1, then the transmission interval TS is increased by TS=TS+a+1 (step 505). And, if (number of retransmission executions)= (maximum number of retransmission executions), then the transmission interval TS is increased by TS=TS+a+2 (step 506).

On the other hand, if in step 502 the transmission interval modification request is not +a, then a check is performed to determine whether the transmission interval modification request is 0 or −b (step 507), and if the transmission interval modification request is 0 then the transmission interval TS is not modified (step 508), but if the transmission interval modification request is −b then the transmission interval TS is shortened by TS=TS−b (step 509).

By means of the above third embodiment, when the number of retransmission executions increases the amount of increase of the data transmission interval is made larger than when the number of retransmission executions is small, so that the number of decoding executions is increased, and the continuation of data errors can be prevented.

(D) Fourth Embodiment

In the first through third embodiments, cases were explained in which data is sent and received between a transmitting station and a receiving station in a one-to-one relationship. When considering transmission efficiency of such one-to-one transmission and reception, as the transmission interval grows longer, the amount of data transmitted per unit time, that is, the transmission efficiency, will decline at the receiving station. However, in actuality, during times in which there is no transmission to the receiving station, the transmitting station transmits data to other receiving stations, and so the transmission efficiency of the communication system as a whole does not decline.

Management of the order of transmission of data (packets) to a plurality of receiving stations with the objective of maximizing the transmission efficiency of the entire system is generally called packet scheduling; the following algorithms (1) through (3) are well-known.

(1) Round Robin method: The user for transmission is switched after each fixed time (or after a fixed amount of data) has elapsed.

(2) Proportional Fairness method: Data is transmitted to the user for which the instantaneous fluctuation component of the CIR (ratio of carrier-wave power to interference power) is greatest.

(3) Max CIR method: Data is transmitted to the user with the largest instantaneous CIR.

In the fourth embodiment, in essence the above algorithms are applied in order to transmit data efficiently from a transmitting station to a plurality of receiving stations.

Figure 12:
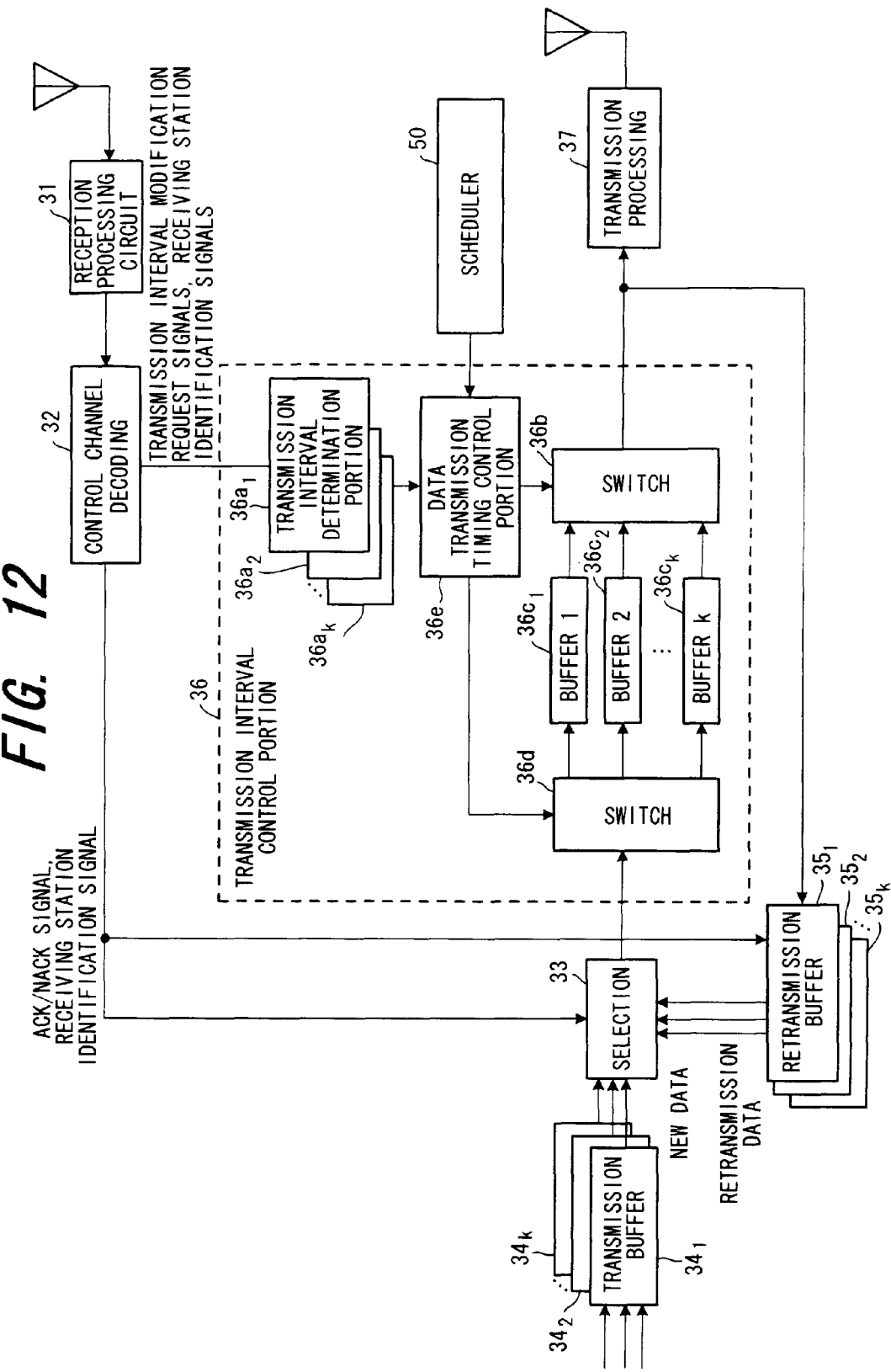
FIG. 12 shows an example of the configuration of a transmitting station which transmits data to K receiving stations.

FIG. 12 is an example of the configuration of a transmitting station which transmits data to K receiving stations, which differs from the transmitting station of the first embodiment (see FIG. 5) in that (1) data is input to transmission buffers $36c_1$ to $36c_K$ in a state of intermixture of data addressed to a plurality of receiving stations; (2) transmission interval determination portions $36a_1$ to $36a_K$ are provided, which determine data transmission intervals for each of the receiving stations; (3) a data transmission timing control portion 36e is provided in the transmission interval control portion 36; (4) a scheduler 50 is provided; and, (5) in the transmission buffers $34_1$ to $34_K$ and retransmission buffers $35_1$ to $35_K$, data is accumulated, differentiated by receiving station. In FIG. 12, the retransmission executions counting portion 38, comparison portion 39, and retransmission buffer control portion 40 of FIG. 5 are omitted.

The selection circuit 33 identifies the receiving station from the receiving station identification signal, and based on ACK/NACK signals, switches between new data for the identified receiving station or data already transmitted to the receiving station, and stores data in the corresponding buffer $36c_1$~$36c_k$ via the switch 36d.

The transmission interval determination portions $36a_1$ to $36a_K$ identify the receiving station from the receiving station identification signal, determine the data transmission interval under control similar to that of the first embodiment for each receiving station, and input the result to the data transmission timing control portion 36e. The scheduler 50 determines data transmission timing for each of the receiving stations according to the above-described algorithms, and inputs the result to the data transmission timing control portion 36e. The data transmission timing control portion 36e basically sends data addressed to the different receiving stations to the transmission processing portion 37 with the transmission timing indicated by the scheduler 50; but when the transmission timing indicated by the scheduler 50 occurs before the transmission timing from the transmission interval determination portions $36a_1$ to $36a_K$ for the receiving stations, data addressed to the receiving stations is sent to the transmission processing portion 37 with the transmission timing from the transmission interval determination portions $36a_1$ to $36a_K$.

A case is considered in which the scheduler 50 applies the Round Robin method as the procedure for packet scheduling. In the Round Robin method, the receiving station to receive transmitted data is switched in order; the transmission time, or the amount of transmitted data, can be determined fairly for each user. However, when the transmission timing indicated by the scheduler 50 occurs before the transmission timing based on transmission intervals requested from the receiving stations, if transmission were performed with the transmission timing indicated by the scheduler, the data reception characteristic would be worse than is desired by the receiving stations, and so the problem of longer transmission delays would occur. Hence in light of the above problem, in the fourth embodiment a packet scheduling algorithm which is an improved version of the Round Robin method is applied.

Figure 13:
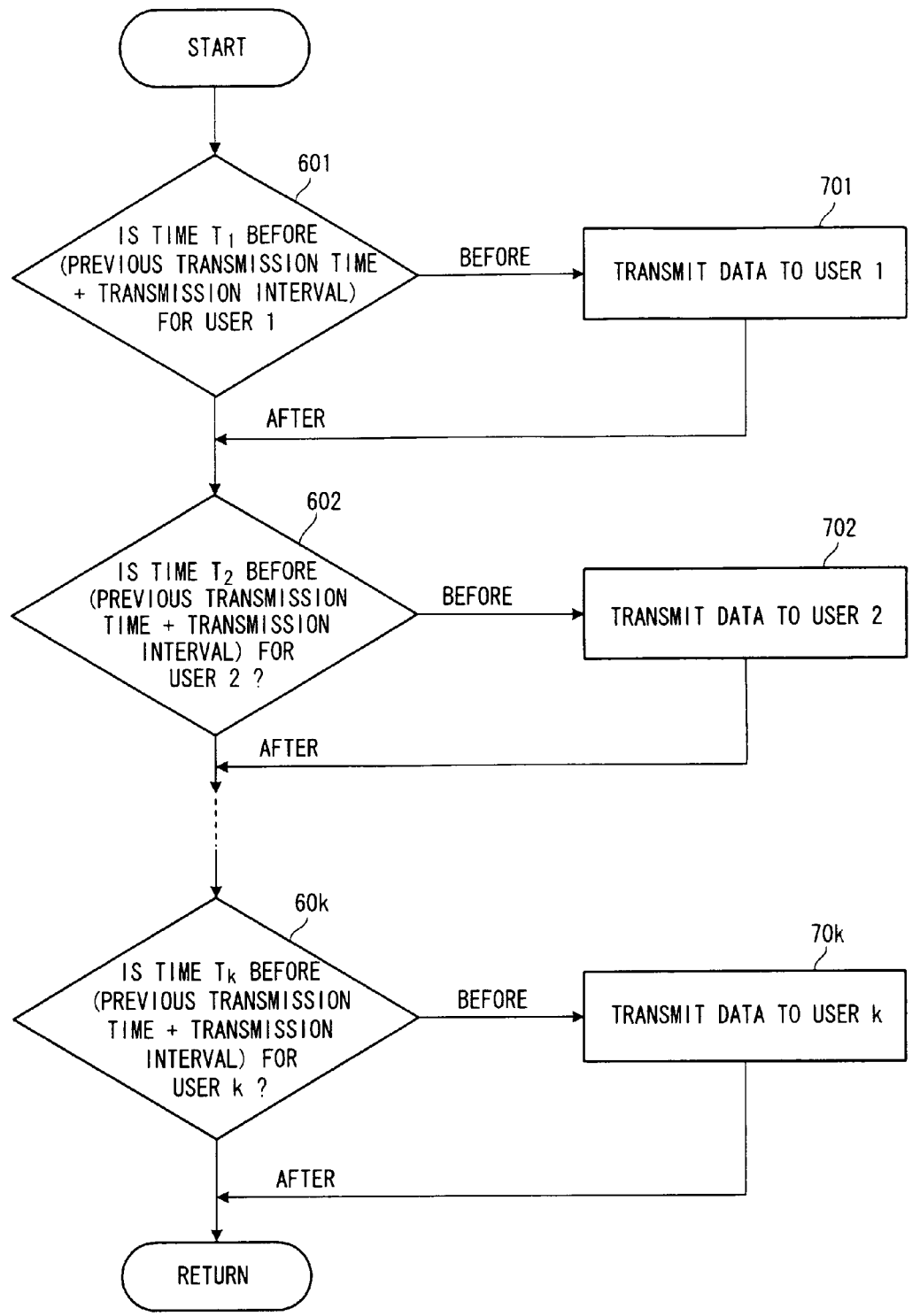
FIG. 13 shows the flow of processing to control the timing of data transmission to receiving stations in a fourth embodiment.

FIG. 13 shows the flow of processing to control the timing of data transmission to each of the receiving stations in the fourth embodiment. Basically, the Round Robin method is used to determine the transmission timing T1 to TK for transmission of data to each of the receiving stations (users), and data is transmitted in order to user 1 through user K with the transmission timing T1 to TK. However, if T is the time, resulting by addition of the transmission interval $TS_1$ determined by the transmission interval determination portion $36a_1$ to the previous time of data transmission to the first user, then a check is performed to determine whether the transmission time T1 to the first user exceeds the time T (step 601), and if the time is not exceeded data is sent to the first user (step 701), but if the time is exceeded, then transmission to the first user is halted, and similar processing is repeated for the next, second user (steps 602-60K, 702-70K).

In the above, an example is given of a packet scheduling algorithm based on the Round Robin method; but methods based on other known algorithms may also be used. That is, in essence the receiving station to which data is to be transmitted is selected according to the algorithm on which the method is based. However, if the time equal to the transmission interval has not elapsed since the time of previous transmission of data to the receiving station, then transmission to the receiving station is halted, and scheduling is again performed.

According to the fourth embodiment, when transmission with the transmission timing indicated by the scheduler results in worsening of the data reception characteristic, data transmission is performed at the data transmission interval requested by the receiving station, so that the reception characteristic can be improved, and the problem of transmission delay lengthening can be eliminated.

Modified Example

In the fourth embodiment, packet scheduling is performed such that when the transmitting station sends and receives data with a plurality of receiving stations, the transmission efficiency for the entire system is maximized. However, as the number of receiving stations increases, there is a tendency for the transmission interval to a single receiving station to become long, and so the problem of a decline in the transmission efficiency for the receiving station arises. For example, focusing on reception processing for a first user in the fourth embodiment, if data is transmitted at time T then the first user can execute repeated decoding a desired number of times to realize a required data reception characteristic. However, in actuality data is transmitted at time T1 (T1>T), so that compared with the case in which data is transmitted at time T, the first user spends (T1−T) more time, and can execute a greater number of decoding repetitions.

Hence in this case, it may be that the desired data reception characteristic can be realized even if the combination of M-bits modulation and coding rate is changed such that the transmission speed is faster than a stipulated setting. Hence in this modified example, the transmission timing for each receiving station is determined in the transmitting station by a method similar to that of the fourth embodiment, but the combination of M-bits modulation and coding rate is switched according to the transmission timing.

Figure 14:
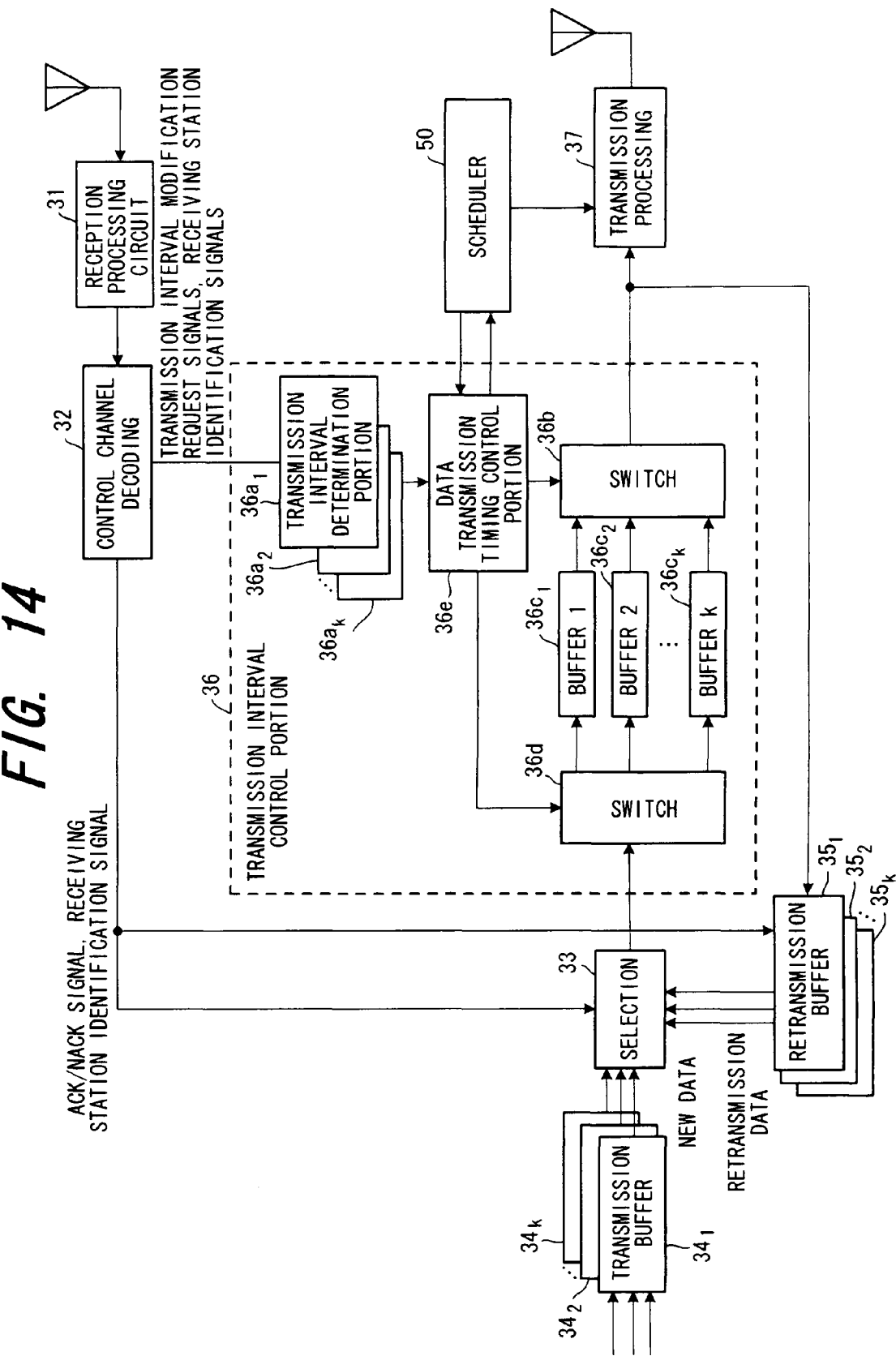
FIG. 14 shows an example of the configuration of the transmitting station of a modified example.
Figure 15:
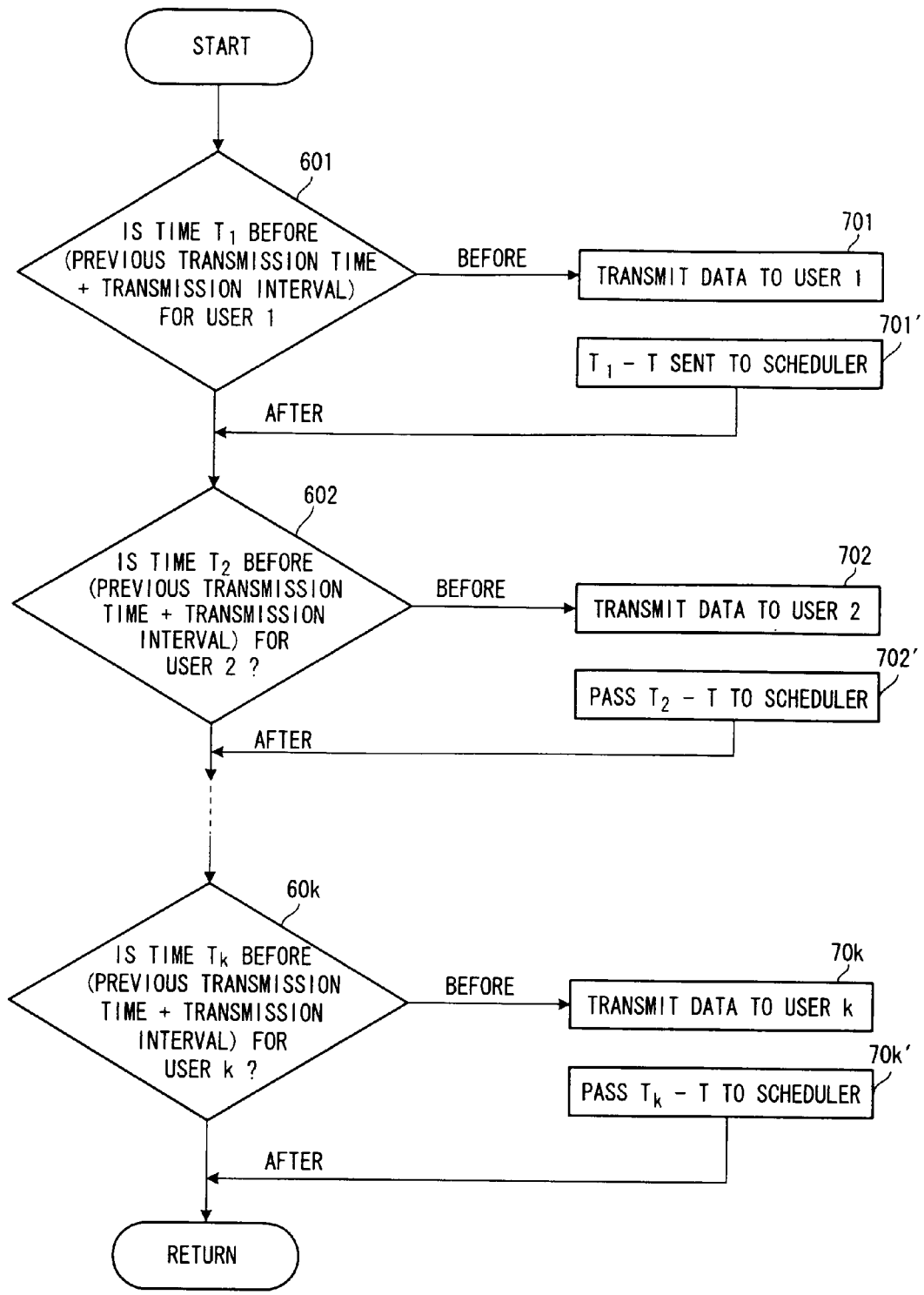
FIG. 15 shows the flow of processing in the modified example.

FIG. 14 shows the configuration of the transmitting station of the modified example; portions which are the same as in the fourth embodiment of FIG. 12 are assigned the same symbols. FIG. 15 shows the flow of processing in the modified example; portions which are the same as in the processing flow of FIG. 13 are assigned the same symbols.

If T is the time resulting by addition of the transmission interval $TS_1$ determined by the transmission interval determination portion $36a_1$ to the time of the previous data transmission to the first user, the data transmission timing control portion 36e checks whether the transmission time T1 indicated by the scheduler 50 has exceeded this time T (step 601). If the time is exceeded (T1>T), the data transmission timing control portion 36e executes control so as to transmit data to the first user (step 701), and then calculates the time difference (T1−T) and notifies the scheduler 50 (step 701'). On the other hand, if in step 601 the time is not exceeded, data transmission to the first user is halted, and similar processing is repeated for the next, second user (601 to 60K, 701, 701' to 70K, 70K').

In steps 701' to 70K', the scheduler 50, upon receiving the time difference (Ti−T), switches the combination of transmission parameters (M-bits modulation, coding rate) for the ith user (receiving station) according to the following (1) and (2).

(1) When the time difference (Ti−T) is smaller than a stipulated threshold: The combination of the M-bits modulation and coding rate is set according to the stipulated setting.

(2) When the time difference (Ti−T) is greater than the stipulated threshold: The combination of the M-bits modulation and coding rate is changed such that the transmission speed is one stage higher than the stipulated setting.

Thus by means of this modified example, the combination of the M-bits modulation and coding rate is switched appropriately according to the timing of transmission to each of the receiving stations, so that as the number of receiving stations increases, the problem of a decline in the transmission efficiency to one receiving station can be alleviated.

(E) Fifth Embodiment

In the first through the fourth embodiments, multiple-stage decoding processing could be executed in a receiving station even when using a single decoding processing circuit by transmitting data from the transmitting station with the transmission interval lengthened, and to this extent the data reception characteristic could be improved, so that the probability of error detection is reduced. As a result the number of retransmissions is reduced, and ultimately the transmission delay is shortened. However, in a method in which multiple-stage processing is normally performed, to the extent that the RTT is increased, the average transmission delay tends to be longer.

In mobile communications, communication is performed in a variety of propagation states, and there is not always a need for multiple-stage decoding processing, so that the number of stages may be reduced according to propagation states. That is, if errors are eliminated prior to performing the preset number of decoding executions, an ACK may be returned to the transmitting station so that new data may be received and decoded next, and by this means efficient packet transmission and reception is possible.

Figure 16:
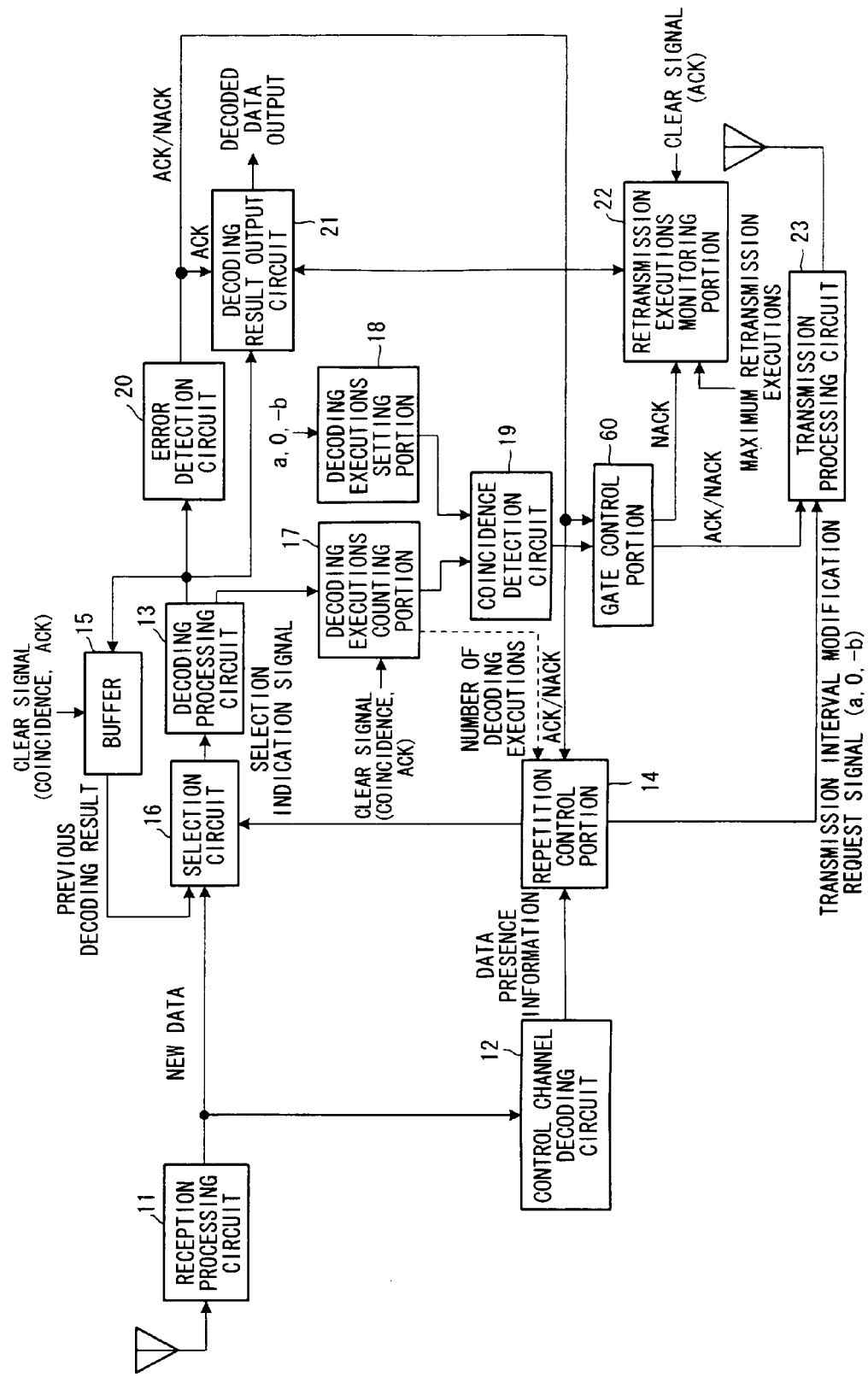
FIG. 16 shows the configuration of the receiving station in a fifth embodiment.

FIG. 16 shows the configuration of a receiving station in a fifth embodiment; portions which are the same as in the first embodiment are assigned the same symbols. Differences with the first embodiment are (1) the fact that the error detection circuit 20 performs error detection for each stage of repeated decoding; (2) the fact that when an error is not detected, the decoding result output circuit 21 outputs the decoding result of the decoding processing circuit 13; and, (3) the fact that even when the number of repeated decoding executions has not reached the preset number of executions, if there are no errors in the decoding result, an ACK signal is transmitted to the transmitting station at that time, and moreover if the number of repeated decoding executions reaches the preset number of executions, the error detection result ACK/NACK is transmitted to the transmitting station.

The gate control portion 60 inputs an ACK signal to the transmission processing circuit 23 if there are no errors in the decoding results, even if the number of repeated decoding executions has not reached the preset number of executions, and inputs the error detection result ACK/NACK to the transmission processing circuit 23 if the number of repeated decoding executions has reached the preset number of executions. As a result, the transmission processing circuit 23 transmits an ACK signal to the transmitting station at this time if there is no error in the decoding results, even if the number of repeated decoding executions has not reached the preset number of executions, and transmits the error detection result ACK/NACK to the transmitting station if the number of repeated decoding executions has reached the preset number of executions.

As a first function, the repetition control portion 14 determines whether to continue repeated decoding or to decode newly received data based on whether there is data in the data channel and on the error detection results for each stage of repeated decoding, and issues a data selection instruction to the selection circuit 16. Specifically, when there is no newly received data, and errors have been detected, the selection circuit 16 is instructed to again decode the previous output signals stored in the buffer 15. In other cases, the selection circuit 16 is instructed to decode newly received data. As a second function, the repetition control portion 14 generates transmission interval modification request signals under control similar to that in the first embodiment.

Figure 17:
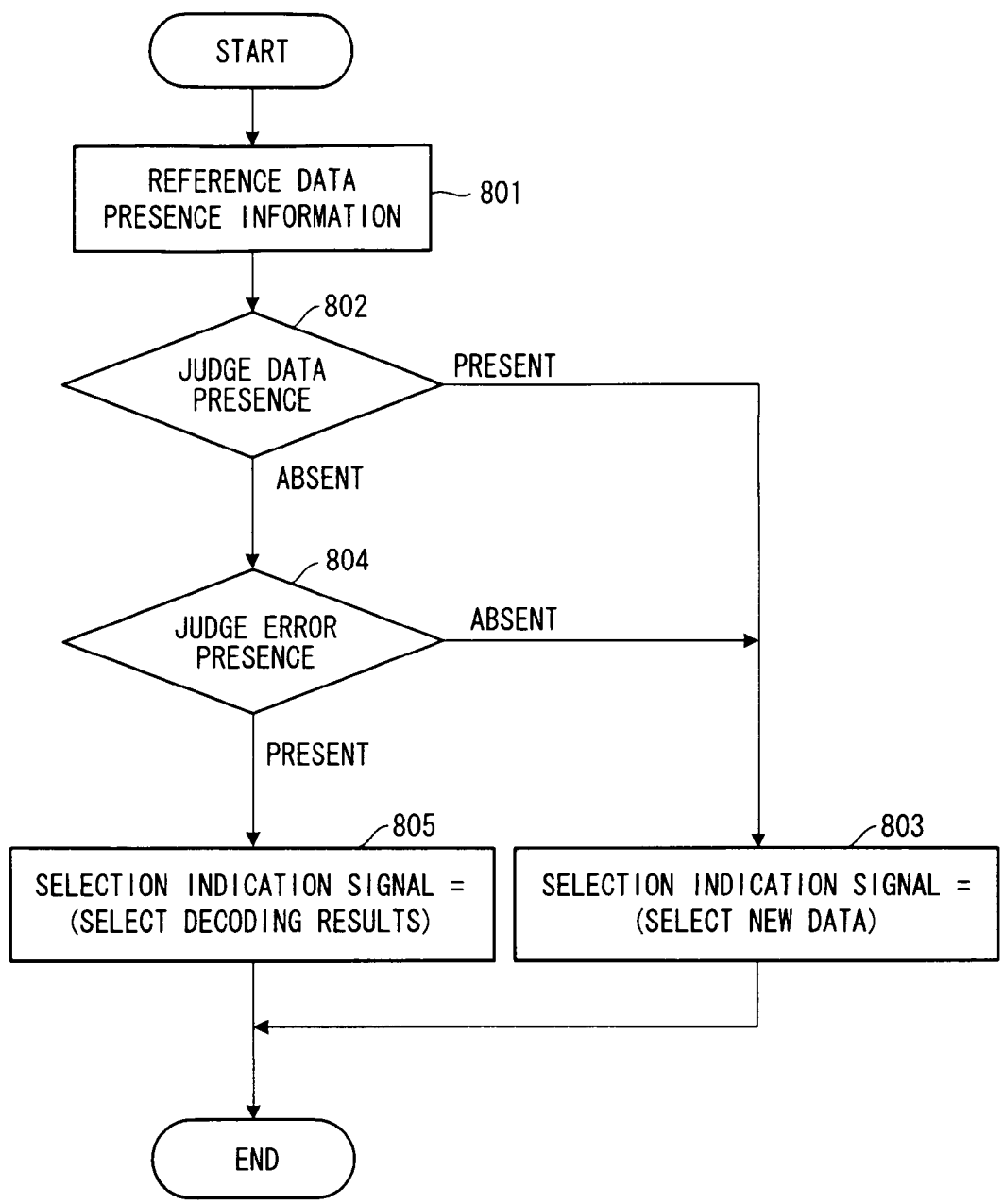
FIG. 17 shows the flow of first data selection control processing in the fifth embodiment.

FIG. 17 shows the flow of first data selection control processing in the fifth embodiment; the repetition control portion 14 references the control channel decoding results (step 801), judges whether there is data in the data channel based on the control channel decoding results (step 802), and if there exists newly received data, instructs the selection circuit 16 to decode the newly received data (step 803). As a result, the selection circuit 16 inputs the newly received data, stored in the reception circuit 11, into the decoding processing circuit 13.

In step 802, if no newly received data exists, the repetition control portion 14 checks whether there are errors in the error detection results (step 804). If there are no errors, the selection circuit 16 is instructed to decode newly received data (step 803), and if there are errors, the selection circuit 16 is instructed to decode the previous decoding results stored in the buffer 15 (step 805). As a result, the selection circuit 16 inputs the previous decoding results, stored in the buffer 15, into the decoding processing circuit 13.

Figure 18:
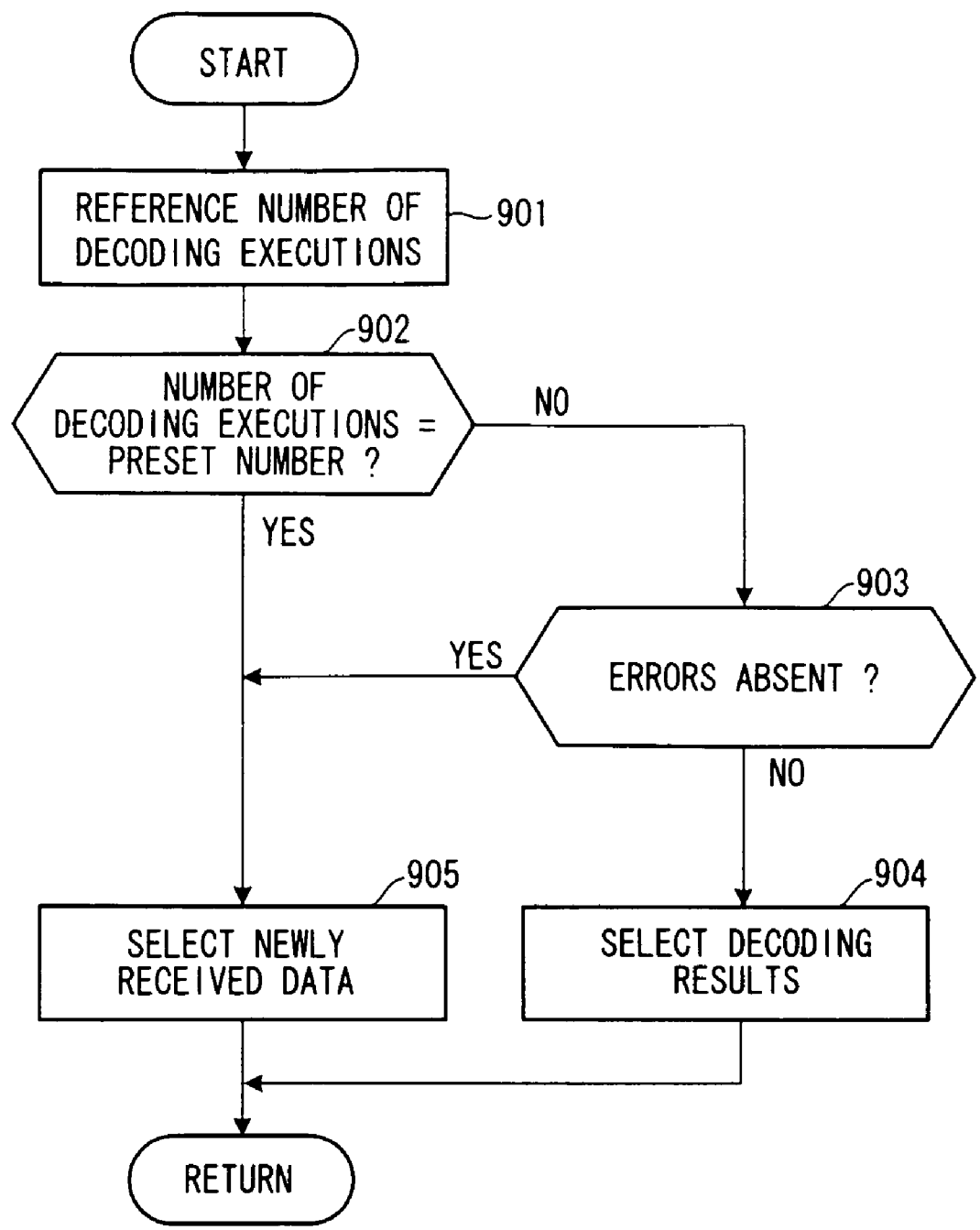
FIG. 18 shows the flow of second data selection control processing in the fifth embodiment.

FIG. 18 shows the flow of second data selection control processing by the repetition control portion 14 in the fifth embodiment. The repetition control portion 14 references the count value (number of decoding executions) of the decoding executions counting portion 17 (step 901), judges whether the number of decoding executions has reached a preset number of executions (step 902), and if the number is smaller than the preset number, references the error detection results and judges whether there are errors (step 903), and if there are errors, instructs the selection circuit 16 to repeat decoding of the previous decoding results, stored in the buffer 15 (step 904). As a result, the selection circuit 16 inputs the previous decoding results stored in the buffer 15 to the decoding processing circuit 13.

If on the other hand there are no errors in step 903, the repetition control portion 14 instructs the selection circuit 16 to decode newly received data (step 905). And, if in step 902 the number of decoding executions is equal to the preset number of executions, the repetition control portion 14 instructs the selection circuit 16 to decode newly received data (step 905). As a result, the selection circuit 16 inputs newly received data, stored in the reception circuit 11, to the decoding processing circuit 13.

The repetition control portion 14 can perform data selection control using either of the methods in FIG. 17 and FIG. 18.

Figure 19:
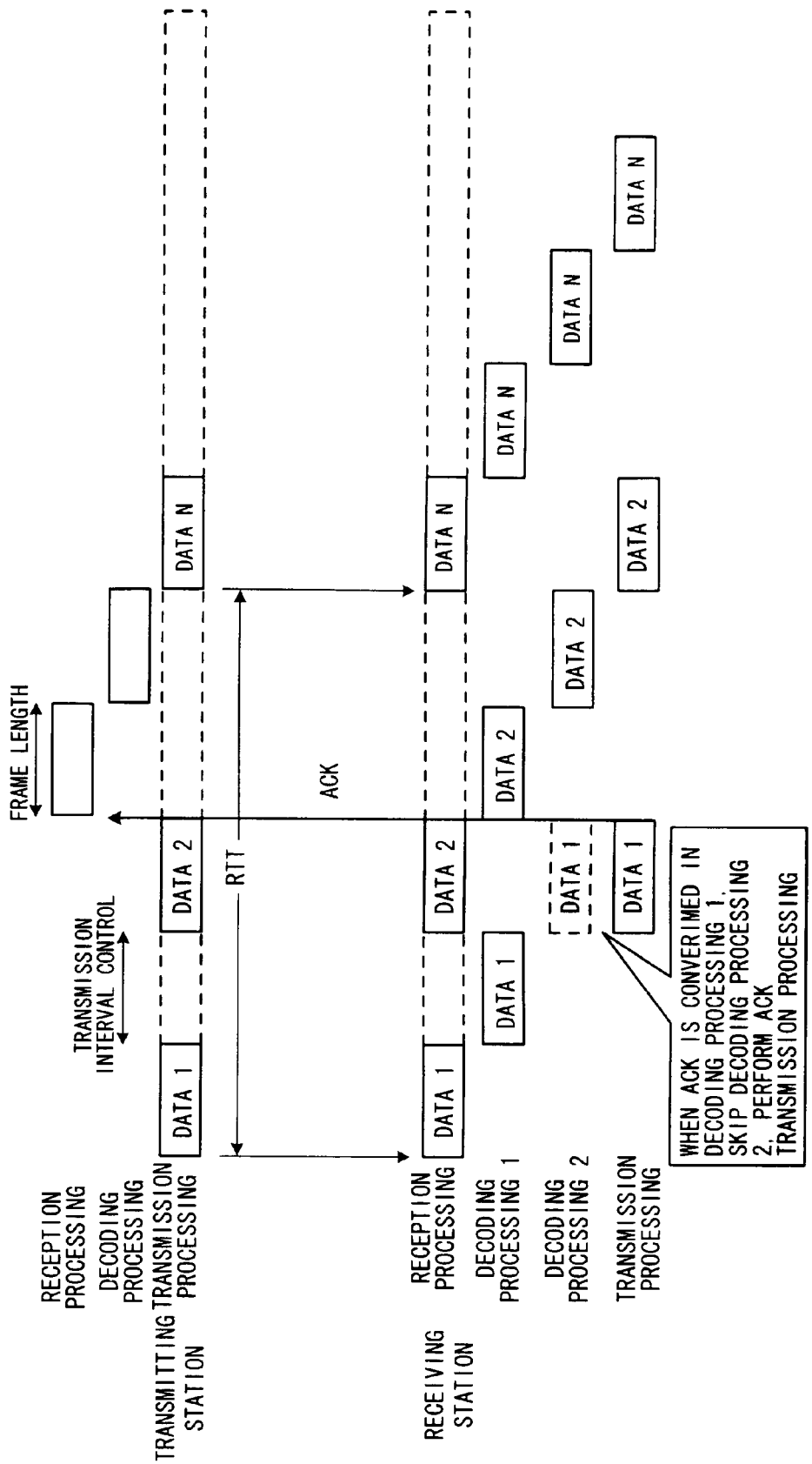
FIG. 19 explains the procedure of data transmission processing in the fifth embodiment.
Figure 20:
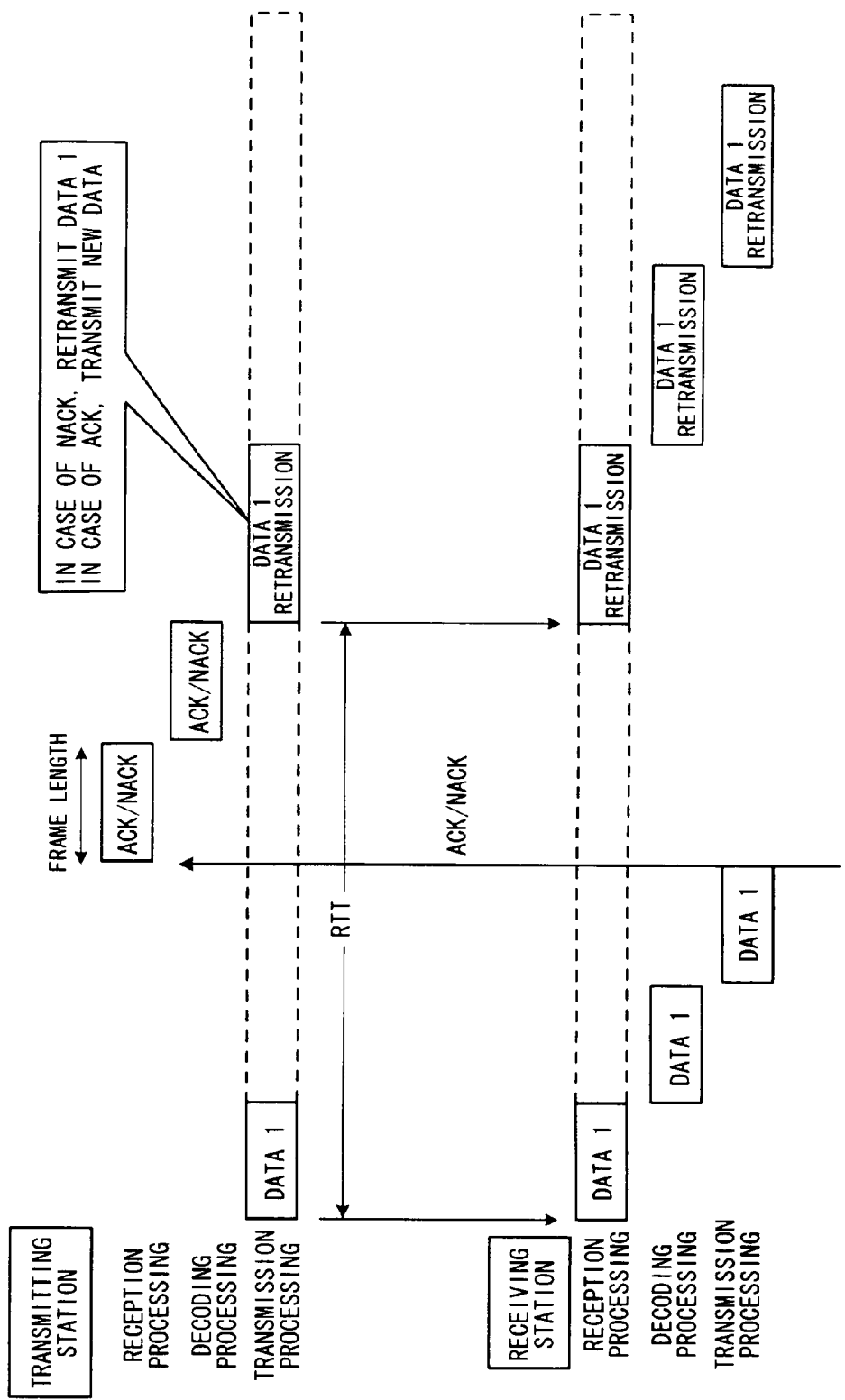
FIG. 20 explains the procedure of processing of the Stop-and-Wait ARQ method, which is a basic ARQ method.

FIG. 19 explains the procedure for data transmission processing in the fifth embodiment. In this example, in order to perform two-stage decoding processing in a receiving station, control is executed at the transmitting station to increase by one frame the transmission interval. In the processing of data 1 at the receiving station, no errors are detected as a result of error detection of the output of stage 1 from decoding processing, and so ACK signal transmission processing is performed without performing stage 2 processing. As a result, the RTT is shortened by one frame compared with the normal case of performing two stages of decoding processing.

According to the fifth embodiment, if errors no longer exist in the decoding results before the number of decoding executions reaches the preset number of executions, then an ACK signal is immediately sent to the transmitting station, and new data is subjected to decoding processing, so that the transmission delay can be reduced.

What is claimed is:
1. A reception apparatus, which performs processing to receive data sent from a transmission apparatus having a retransmission function, processing to perform error detection and decoding of the data, and processing to transmit error detection results to the transmission apparatus, comprising:
   a decoding processor which repeatedly performs data decoding processing;
   an error detector which performs error detection of decoding results;

a transmitter which transmits, to the transmission apparatus, the error detection results for the decoding results for a preset number of times, and a request to the transmission apparatus to modify the data transmission interval, based on the data reception characteristic; and, a data selector which selectively inputs to the decoding processing portion data received from the transmission apparatus and previous decoding result data.

2. The reception apparatus according to claim 1, further comprising a decoding executions setting portion which modifies the preset number of executions of the repeated decoding processing based on the data transmission interval modification requests.

3. The reception apparatus according to claim 1, wherein the data selector inputs the previous decoding result data to the decoding processor when new data is not being received from the transmission apparatus, and inputs new reception data to the decoding processor when the new data is being received.

4. The reception apparatus according to claim 1, wherein the data selector inputs the previous decoding result data to the decoding processor when the number of actual repeated decoding executions is equal to or less than the preset number of executions, and inputs the received data to the decoding processor when the preset number of decoding executions are completed.

5. The reception apparatus according to claim 1, wherein the transmitter transmits a request to the transmission apparatus to lengthen the data transmission interval when the signal power-to-interference power ratio (SIR) is lower than a stipulated first threshold, issues a request to the transmission apparatus to shorten the data transmission interval when the SIR is higher than a second threshold, and issues a request to the transmission apparatus to maintain the data transmission interval when the SIR is equal to or greater than the first threshold and equal to or less than the second threshold.

6. The reception apparatus according to claim 1, wherein the error detector performs error detection of decoding results, the transmitter transmits error detection results to the transmission apparatus if an error disappears before the number of decoding executions reaches the prescribed number of executions, and the data selector inputs data received from the transmission apparatus to the decoding processor.

7. The reception apparatus according to claim 1, wherein the transmitter transmits a request to the transmission apparatus to lengthen the data transmission interval when the error occurrence rate in the detection results is higher than a stipulated first threshold, issues a request to the transmission apparatus to shorten the data transmission interval when the error occurrence rate is lower than a second threshold, and issues a request to the transmission apparatus to maintain the data transmission interval when the error occurrence rate is equal to or greater than the second threshold and equal to or less than the first threshold.

8. The reception apparatus according to claim 7, further comprising a retransmission executions monitoring portion which monitors the number of retransmission executions, wherein
when lengthening the data transmission interval, the transmitter increases the proportion of lengthening of the data transmission interval as the number of retransmission executions approaches a maximum number of retransmission executions.

9. A transmission apparatus, having a retransmission function which transmits new data or retransmits previously transmitted data based on normal/abnormal reception result data sent from a reception apparatus, the transmission apparatus comprising:
a receiver which receives data transmission interval modification requests sent from the reception apparatus;
a transmission interval controller which determines a data transmission interval based on the transmission interval modification requests, and controls transmission of new transmission data or retransmission of previously transmitted data to the reception apparatus based on the determined transmission interval; and
a scheduler which determines the transmission timing for a plurality of reception apparatus, wherein
the transmission interval controller performs data transmission according to the transmission timing indicated by the scheduler, but when the transmission timing indicated by the scheduler is faster than the transmission timing based on transmission interval modification requests from the respective reception apparatus, performs data transmission according to the transmission timing based on the transmission interval modification requests from the respective reception apparatus.

10. The transmission apparatus according to claim 9, wherein, upon transmission to each of the reception apparatus, the scheduler sets a combination of M-bits modulation and coding rate to a stipulated combination when the time difference between the indicated transmission timing and the transmission timing based on transmission interval modification requests from reception apparatus is lower than a threshold, and switches the combination of M-bits modulation and coding rate such that the transmission speed is faster than for the stipulated combination when the time difference is greater than the threshold.

11. A reception method of performing, in a reception apparatus, processing to receive data sent from a transmission apparatus having a retransmission function, processing to perform error detection and decoding of the data, and processing to transmit error detection results to the transmission apparatus, the method comprising:
repeatedly performing decoding processing of data in a decoding processor;
performing error detection of decoding results, and transmitting to the transmission apparatus error detection results for the decoding results for a preset number of times;
issuing to the transmission apparatus a request for data transmission interval modification, based on the data reception characteristic; and,
inputting selectively, to the decoding processor, data received from the transmission apparatus and previous decoding result data.

12. The reception method according to claim 11, wherein the number of executions of the repeated decoding processing is modified based on the data transmission interval modification requests.

13. The reception method according to claim 11, wherein, when new data is not being received from the transmission apparatus, the previous decoding results data is input to the decoding processor, and when new data is being received, the newly received data is input to the decoding processor.

14. The reception method according to claim 11, wherein, when the number of actual executions of repeated decoding is equal to or less than the preset number of executions the previous decoding results data is input to the decoding processor, and when the preset number of decoding executions has been completed, the received data is input to the decoding processor.

15. The reception method according to claim 11, wherein, a request is issued to the transmission apparatus to lengthen the data transmission interval when the error occurrence rate is higher than a stipulated first threshold, a request is issued to the transmission apparatus to shorten the data transmission interval when the error occurrence rate is lower than a second threshold, and a request is issued to the transmission apparatus to maintain the data transmission interval when the error occurrence rate is equal to or greater than the second threshold and equal to or less than the first threshold.

16. The reception method according to claim 11, wherein, a signal power-to-interference power ratio SIR is calculated, and a request is issued to the transmission apparatus to lengthen the data transmission interval when the SIR value is lower than a stipulated first threshold, a request is issued to the transmission apparatus to shorten the data transmission interval when the SIR value is higher than a second threshold, and a request is issued to the transmission apparatus to maintain the data transmission interval when the SIR value is equal to or greater than the first threshold and equal to or less than the second threshold.

17. The reception method according to claim 11, wherein error detection of the decoding results is performed, and when an error disappears before the number of decoding executions reaches the preset number of executions, the error detection result is transmitted to the transmission apparatus, and data received from the transmission apparatus is input to the decoding processor.

18. A transmission method for a transmission apparatus having a retransmission function for transmitting new data or retransmitting previously transmitted data based on normal/abnormal reception result data received from a reception apparatus, the method comprising:

receiving, from a reception apparatus, a transmission interval modification request signal requesting modification of a data transmission interval;

determining the data transmission interval based on transmission interval modification request signals; and transmitting new transmission data, or previously transmitted data, to the reception apparatus, based on the determined transmission interval, wherein data transmission is performed according to transmission timing indicated by a scheduler, but when the transmission timing indicated by the scheduler is faster than the transmission timing based on the transmission intervals requested from each of a plurality of reception apparatus, the data transmission is performed according to the transmission timing based on the transmission interval requested by each of the reception apparatus.

* * * * *